(12) United States Patent
Ishizuka

(10) Patent No.: US 8,687,915 B2
(45) Date of Patent: Apr. 1, 2014

(54) IMAGE PROCESSING APPARATUS, SYSTEM, METHOD AND PROGRAM STORAGE MEDIUM FOR GENERATING A DETERMINATION IMAGE FOR DETERMINING WHETHER OR NOT MOIRÉ WILL OCCUR IN IMAGE DATA FOR PLATE MAKING

(75) Inventor: Ryuichi Ishizuka, Yokohama (JP)

(73) Assignee: Fuji Xerox Co., Ltd., Tokyo (JP)

(*) Notice: Subject to any disclaimer, the term of this patent is extended or adjusted under 35 U.S.C. 154(b) by 824 days.

(21) Appl. No.: 12/814,608

(22) Filed: Jun. 14, 2010

(65) Prior Publication Data
US 2011/0064328 A1  Mar. 17, 2011

(30) Foreign Application Priority Data

Sep. 11, 2009 (JP) ................................ 2009-211090
Mar. 19, 2010 (JP) ................................ 2010-064559

(51) Int. Cl.
*G06K 9/40* (2006.01)

(52) U.S. Cl.
USPC ........................................................ 382/275

(58) Field of Classification Search
None
See application file for complete search history.

(56) References Cited

U.S. PATENT DOCUMENTS

| | | | | |
|---|---|---|---|---|
| 5,341,227 A | * | 8/1994 | Kumashiro | 358/533 |
| 5,872,867 A | * | 2/1999 | Bergen | 382/254 |
| 5,995,638 A | * | 11/1999 | Amidror et al. | 382/100 |
| 7,342,696 B2 | * | 3/2008 | Curry et al. | 358/533 |
| 7,751,608 B2 | * | 7/2010 | Hersch et al. | 382/135 |
| 7,916,924 B2 | * | 3/2011 | Liu et al. | 382/135 |
| 2002/0012447 A1 | * | 1/2002 | Amidror et al. | 382/100 |
| 2002/0051261 A1 | | 5/2002 | Shiomi | |
| 2003/0206662 A1 | * | 11/2003 | Avinash et al. | 382/254 |
| 2004/0022444 A1 | * | 2/2004 | Rhoads | 382/232 |
| 2004/0091131 A1 | * | 5/2004 | Honsinger et al. | 382/100 |
| 2004/0190018 A1 | | 9/2004 | Marsden et al. | |

(Continued)

FOREIGN PATENT DOCUMENTS

| | | |
|---|---|---|
| GB | 2170373 A | 7/1986 |
| JP | 2000-224415 A | 8/2000 |
| JP | 2002-142108 A | 5/2002 |
| JP | 2004-249737 A | 9/2004 |

OTHER PUBLICATIONS

European Search Report dated Feb. 9, 2011 for European Patent Application No. 10169667.2-2202.

(Continued)

*Primary Examiner* — Randolph I Chu
(74) *Attorney, Agent, or Firm* — Sughrue Mion, PLLC

(57) ABSTRACT

A determination image generator of an image processing apparatus compares, in pixel units, sixth image data with seventh image data or second image data. The sixth image data is obtained by selecting, in pixel units, a minimum value of a value of first image data and a value of fifth image data which is edge enhanced data of the first image data. The seventh image data is obtained by performing first processing to second image data. The generator sets in the determination image a third value for pixels where a value of the sixth image data is equal to or less than a value of the seventh image data or the second image data, or is equal to or less than a sum of the value of the seventh image data or the second image data and a first value, and sets a different value for all other pixels.

43 Claims, 30 Drawing Sheets

(56) References Cited

U.S. PATENT DOCUMENTS

2006/0152765 A1    7/2006  Adachi
2010/0314861 A1*  12/2010  Amidror et al. ............... 283/85
2011/0097008 A1*  4/2011  Cao et al. .................... 382/260

OTHER PUBLICATIONS

Korean Office Action ("Notice for Submission of Opinions") mailed Sep. 12, 2013 for Korean patent application 10-2012-0066110.

* cited by examiner

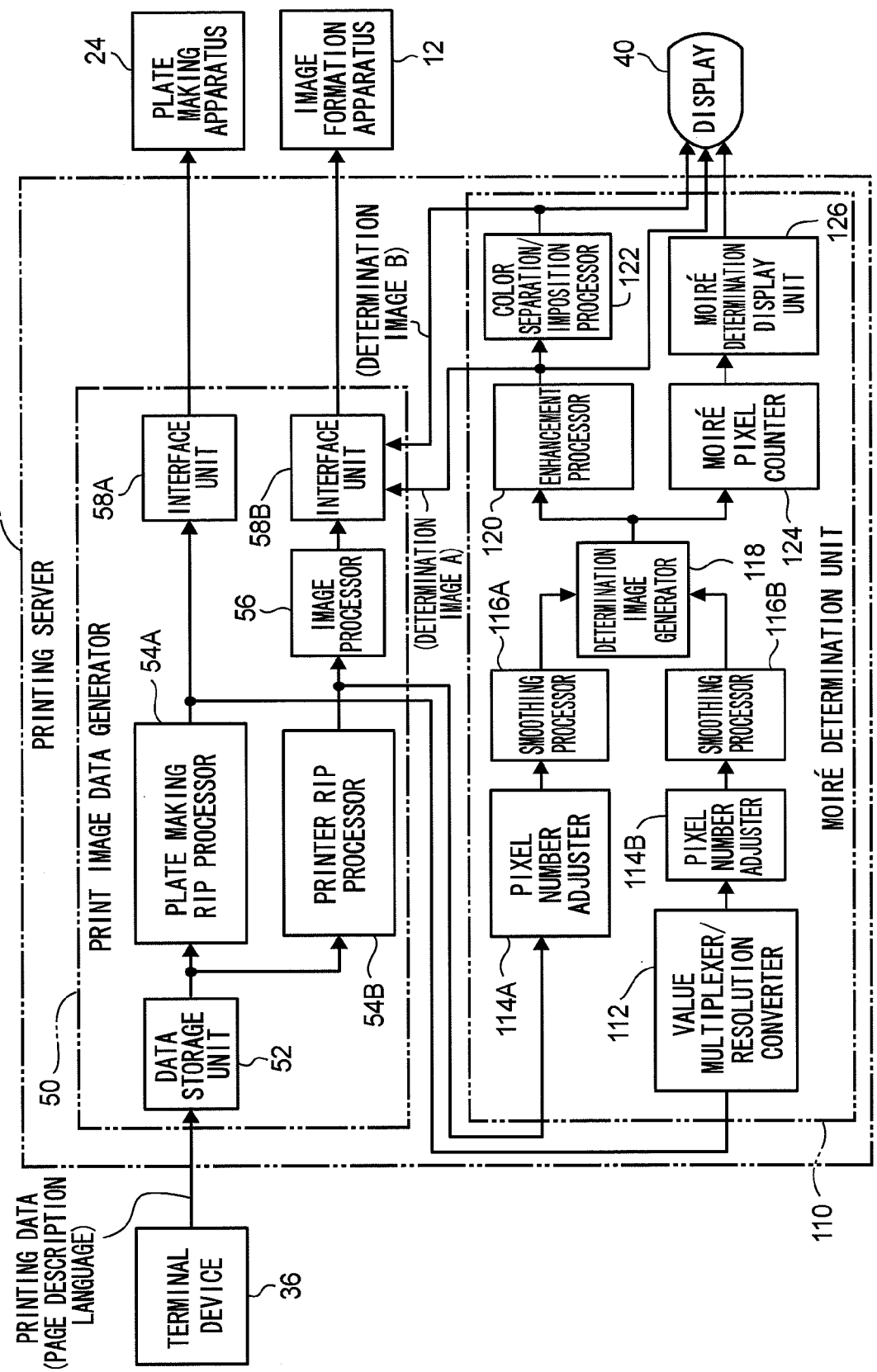

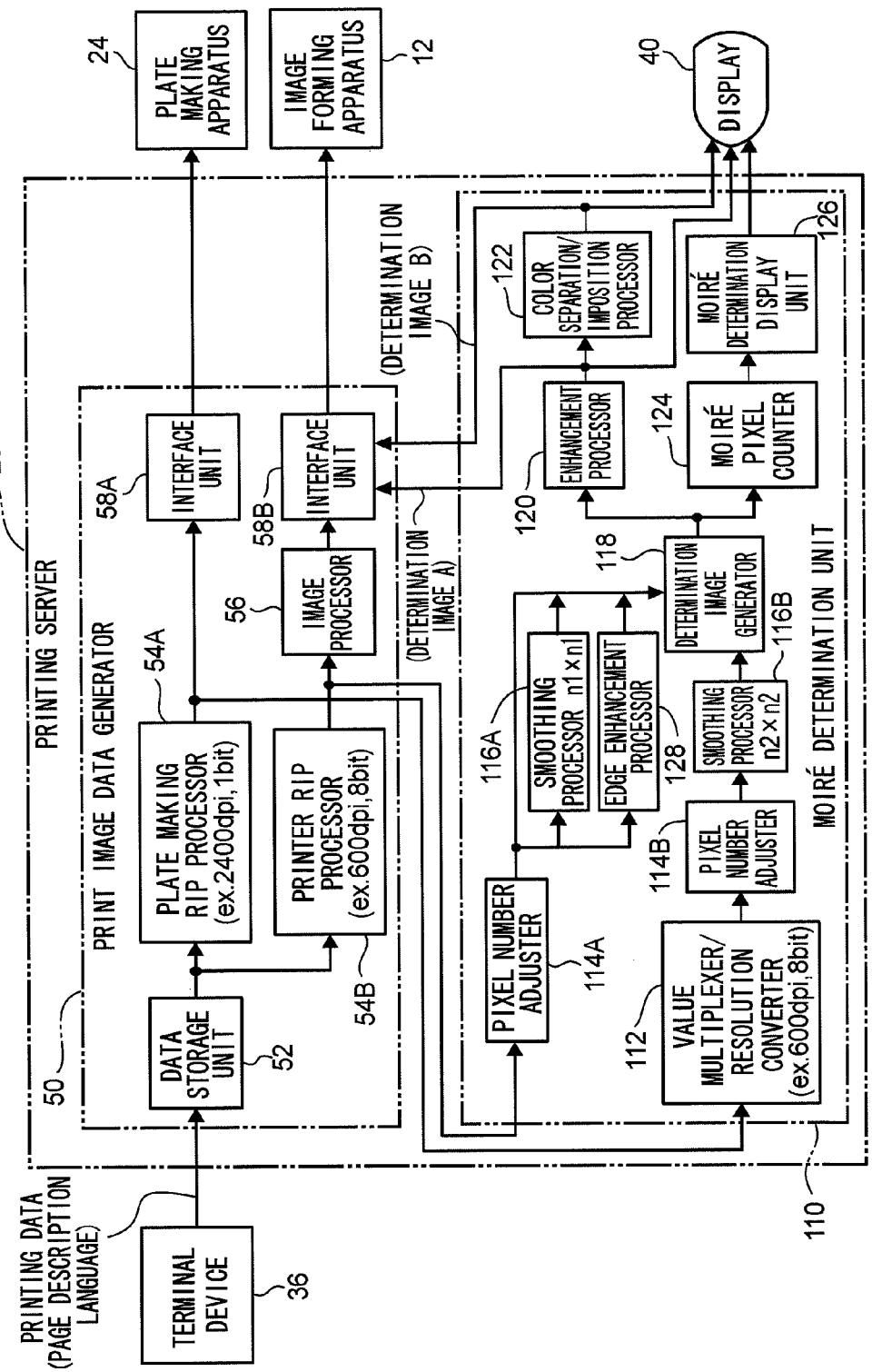

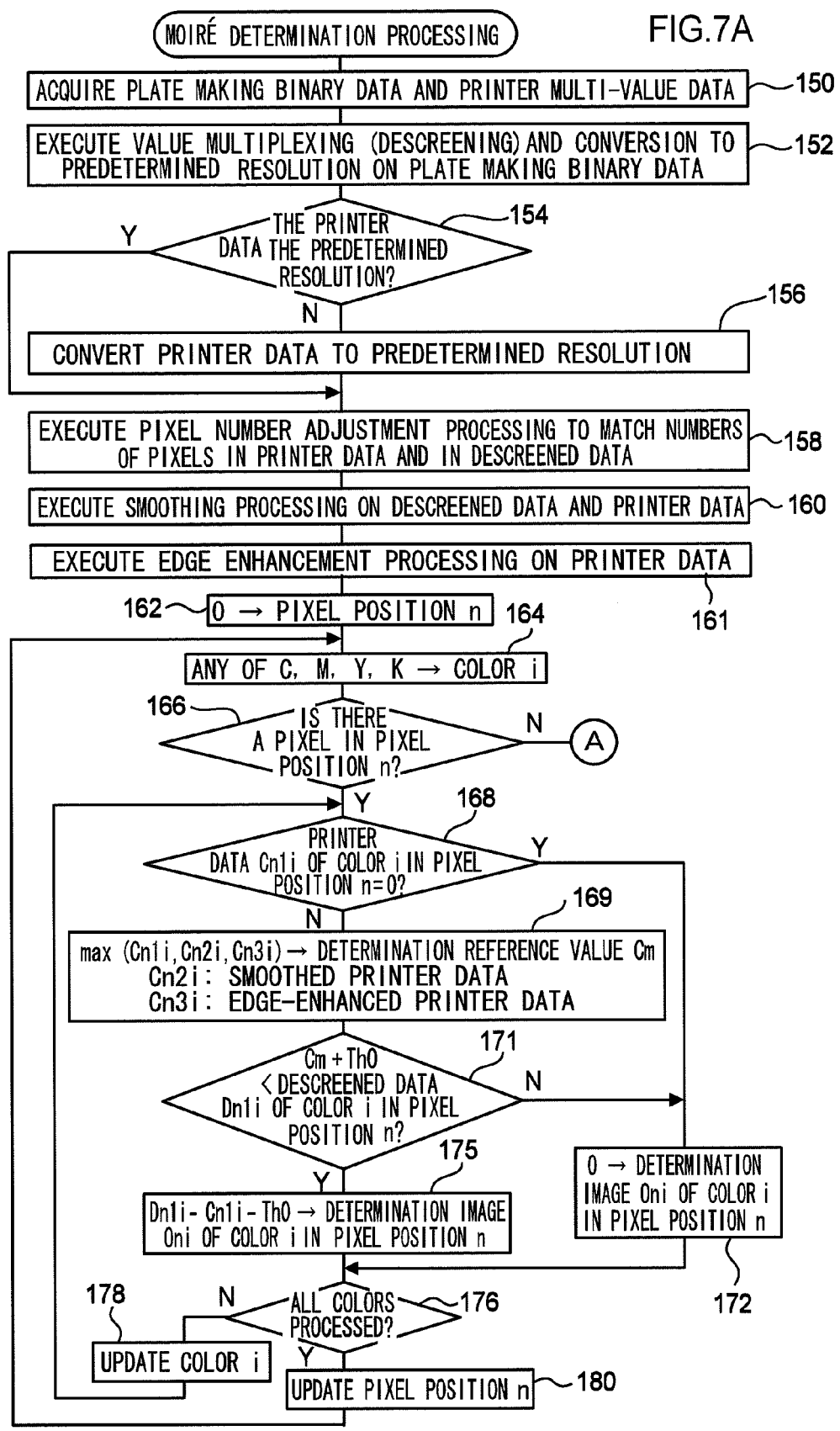

EXAMPLE OF CHANGE IN EACH SET OF DATA IN EDGE PORTION OF PHOTO IMAGE IN ANOTHER EXBODIMENT USING SMOOTHED PRINTER DATA

———— : DESCREENED DATA
▬▬▬ : DATA OBTAINED BY PERFORMING SMOOTHING PROCESSING ON PRINTER DATA
- - - - : PRINTER DATA
· · · · · : THRESHOLD VALUE Th0 + DATA OBTAINED BY PERFORMING SMOOTHING PROCESSING ON PRINTER DATA

EXAMPLE OF EACH SET OF DATA IN EDGE PORTION OF PHOTO IMAGE IN
MOIRÉ DETERMINATION PROCESSING OF FOURTH EMBODIMENT

——— : DESCREENED DATA
━━━ : DATA OBTAINED BY APPLYING EDGE ENHANCEMENT TO DESCREENED DATA
······ : PRINTER DATA
—·— : MAXIMUM VALUE OF NEIGHBORING N PIXELS OF PRINTER DATA

EXAMPLE OF EACH SET OF DATA IN EDGE PORTION OF PHOTO IMAGE WHEN USING MAXIMUM VALUE OF NEIGHBORING N PIXELS OF PRINTER DATA

——— : MINIMUM VALUE (DESCREENED DATA, DATA OBTAINED BY APPLYING EDGE ENHANCEMENT TO DESCREENED DATA)
—·— : MAXIMUM VALUE OF NEIGHBORING N PIXELS OF PRINTER DATA
········ : THRESHOLD VALUE Th0 + MAXIMUM VALUE OF NEIGHBORING N PIXELS OF PRINTER DATA

EXAMPLE OF CHANGE IN EACH SET OF DATA IN PORTION WHERE DENSITY IS SUBSTANTIALLY UNIFORM IN MOIRE DETERMINATION PROCESSING OF FOURTH EXEMPLARY EMBODIMENT

―― : DESCREENED DATA
━━ : DATA OBTAINED BY APPLYING EDGE ENHANCEMENT TO DESCREENED DATA
······ : PRINTER DATA
─·─ : MAXIMUM VALUE OF NEIGHBORING N PIXELS OF PRINTER DATA

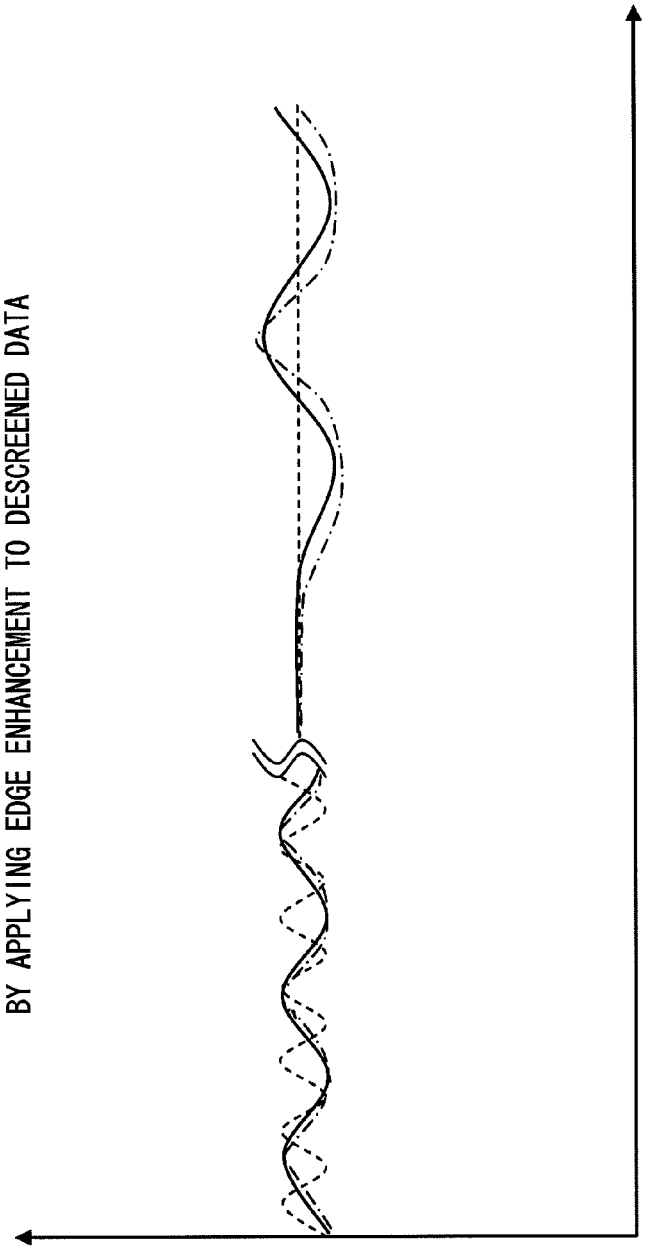

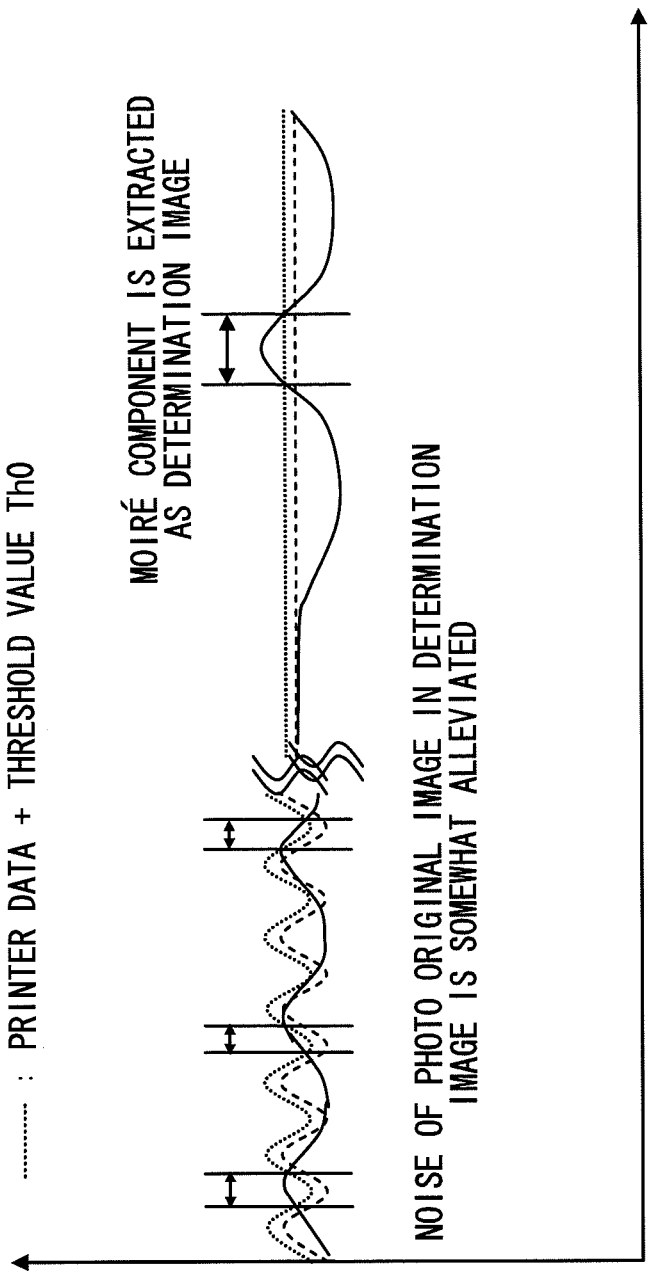

IMAGE PROCESSING APPARATUS, SYSTEM, METHOD AND PROGRAM STORAGE MEDIUM FOR GENERATING A DETERMINATION IMAGE FOR DETERMINING WHETHER OR NOT MOIRÉ WILL OCCUR IN IMAGE DATA FOR PLATE MAKING

CROSS-REFERENCE TO RELATED APPLICATION

This application is based on and claims priority under 35 USC 119 from Japanese Patent Application Nos. 2009-211090 and 2010-064559, respectively filed on Sep. 11, 2009 and Mar. 19, 2010.

BACKGROUND

1. Technical Field

The present invention relates to an image processing apparatus, system, method and program storage medium.

2. Related Art

Conventionally, there have been proposed technologies that check for moiré in an image of a printing target.

SUMMARY

An aspect of the present invention is an image processing apparatus including a generator that compares, in pixel units, sixth image data with seventh image data or second image data, and generates a determination image, wherein the sixth image data is obtained by selecting, in pixel units, a minimum value of a value of first image data of a determination target and a value of fifth image data obtained by performing edge enhancement processing to the first image data, the seventh image data is obtained by performing preset first processing with respect to second image data for comparison representing the same image as the first image data, and the generator sets in the determination image a preset third value for pixels where a value of the sixth image data is equal to or less than a value of the seventh image data or the second image data, or is equal to or less than a sum of the value of the seventh image data or the second image data and a preset first value, and sets a value different from the third value for all other pixels.

BRIEF DESCRIPTION OF THE DRAWINGS

Exemplary embodiments of the present invention will be described in detail based on the following figures, wherein:

FIG. 3 is a functional block diagram of a printing server pertaining to a first exemplary embodiment;

FIG. 6 is a functional block diagram of a printing server pertaining to a second exemplary embodiment;

FIGS. 7A and 7B are flowcharts showing a flow of moiré determination processing pertaining to the second exemplary embodiment;

FIG. 27 is a line graph showing an example of change in each set of data in a portion whose density is substantially uniform in the moiré determination processing pertaining to the fifth exemplary embodiment; and FIG. 28 is a line graph showing an example of change in each set of data in a portion whose density is substantially uniform, when a minimum value of neighboring N pixels of enhancement-processed descreened data is used in the moiré determination processing pertaining to the fifth exemplary embodiment.

DETAILED DESCRIPTION

First Exemplary Embodiment

Figure 1:
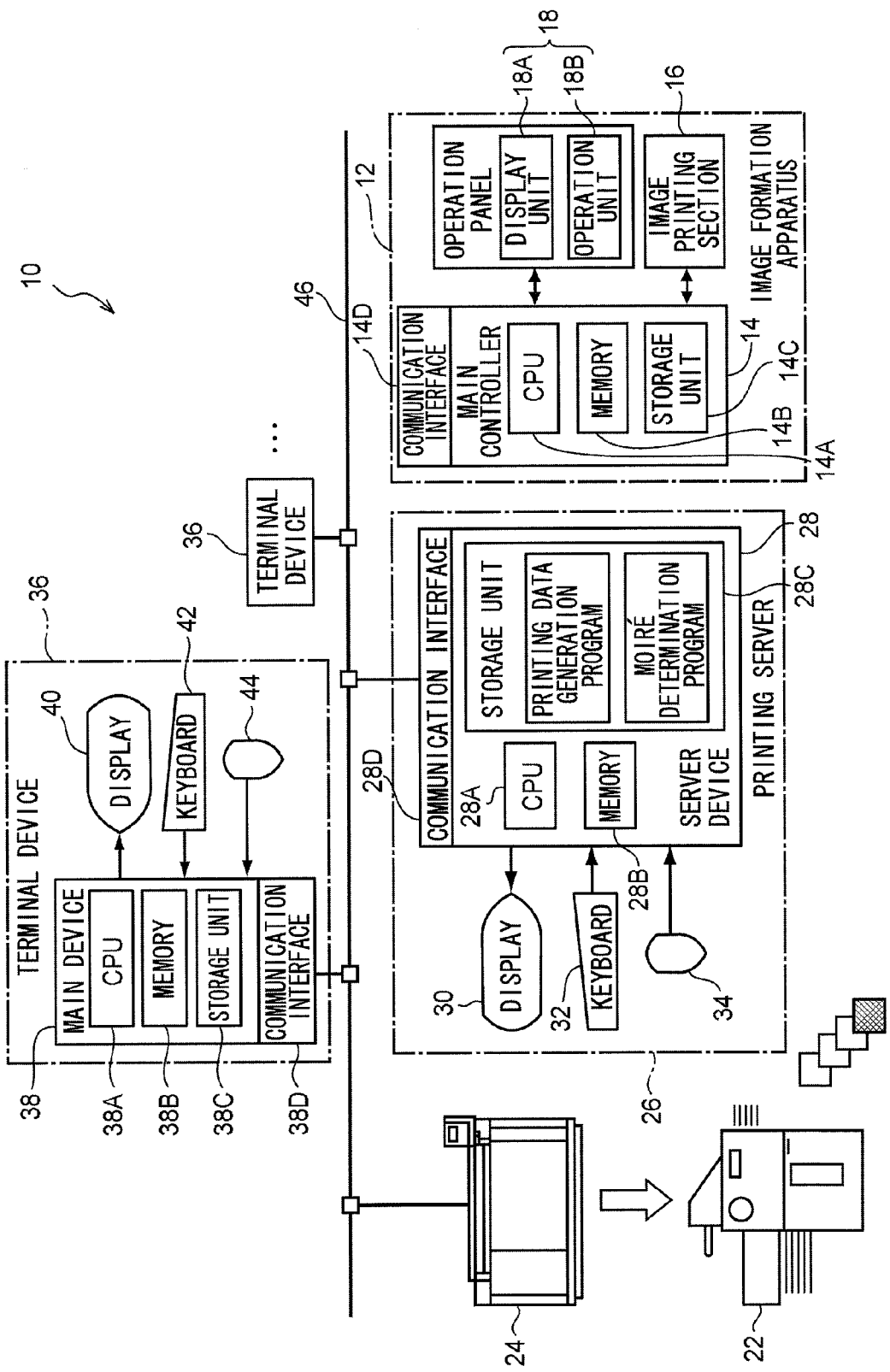
FIG. 1 is a block diagram showing the general configuration of a printing system pertaining to the exemplary embodiments.

FIG. 1 shows a printing system 10 pertaining to the exemplary embodiments. The printing system 10 includes an image formation apparatus 12, which functions as a printer that forms a visible color image on recording paper by an electrophotographic process on the basis of inputted print image data, and a plate making apparatus (CTP: Computer To Plate) 24, which directly creates printing plates for performing printing in a printing machine (a press) 22 from inputted print image data. The image formation apparatus 12 is connected to a printing server 26 via a communication line. The printing server 26 is connected to the plate making apparatus 24 and plural terminal devices 36 via a communication line 46.

The image formation apparatus 12 includes a main controller 14 that has built therein a CPU 14A formed of a microcomputer or the like, a memory 14B, a nonvolatile storage unit 14C formed of a hard disk drive (HDD) or a flash memory, and a communication interface unit 14D. The image formation apparatus 12 is connected to the printing server 26 via the communication interface unit 14D. An image printing section 16 that prints an image represented by inputted print image data on recording paper and an operation panel 18 in which are disposed a display unit 18A formed of an LCD or the like and an operation unit 18B formed of a numerical keypad and a touch panel or the like are connected to the main controller 14.

Figure 2:
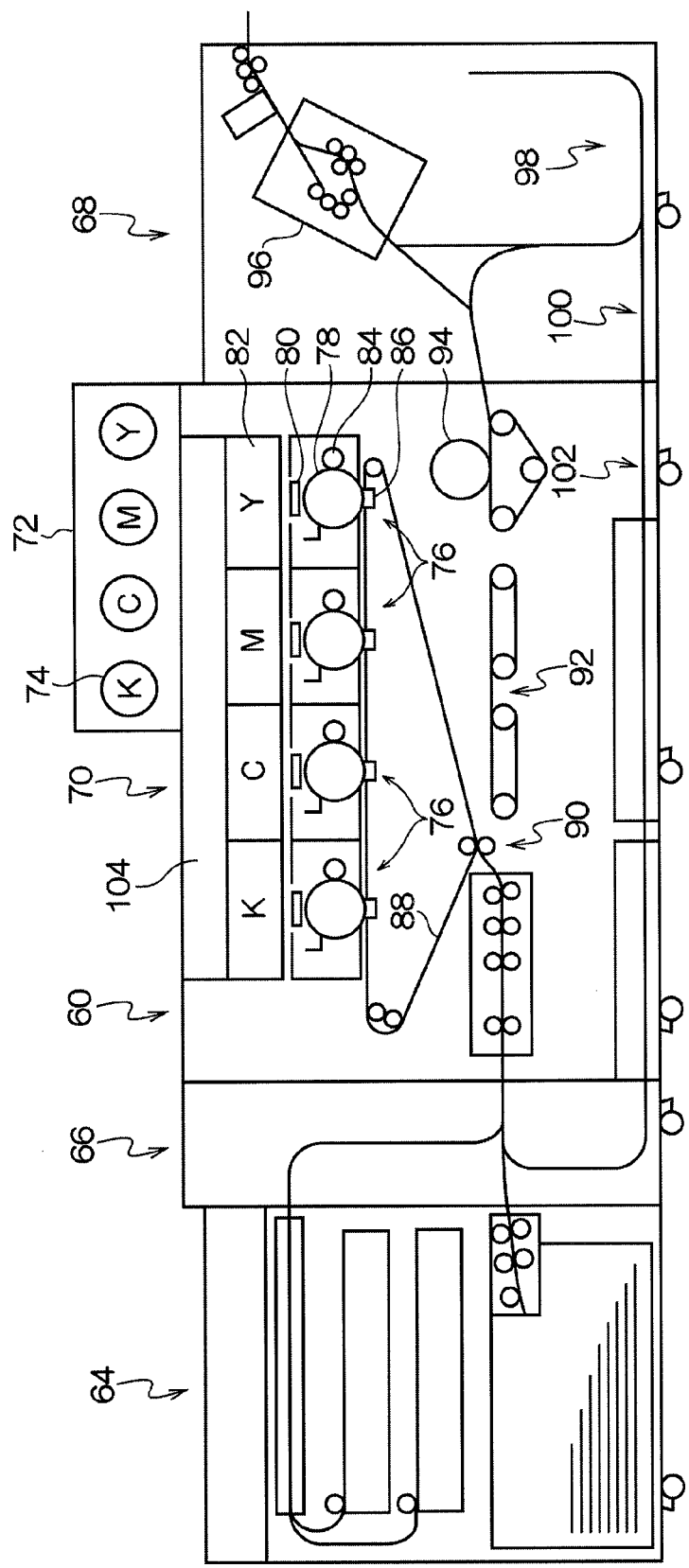
FIG. 2 is a general configuration diagram of an image formation apparatus.

As shown in FIG. 2, the image printing section 16 includes an image formation module 60, a feeder module (FM) 64 that feeds recording paper to the image formation module 60, a connecting module 66 that interconnects the image formation module 60 and the feeder module 64, and an output module 68 that discharges, to the outside, recording paper on which an image has been formed by the image formation module 60. The feeder module 64 may have a multistage configuration. A finisher module may also be disposed downstream of the output module 68. Examples of the finisher module may include a finisher module including a stapler that stacks sheets of the recording paper and binds the sheets in one place in a corner portion of the stack or in two or more places along one edge of the stack, and a finisher module including a punching mechanism that punches punch holes for filing. The finisher module may also be used in an offline state where the image formation apparatus 12 is not connected via a communication line to another device.

The image formation module 60 includes an image formation core unit 70 and a toner supply unit 72. Toner cartridges 74 of the four colors of C, M, Y, K are loaded into the toner supply unit 72. The image formation core unit 70 includes four print engines (printing units) 76 corresponding to each color component of C, M, Y, K. The print engines 76 are arranged in one row along the direction of rotation of an endless intermediate transfer belt 88 (i.e., arranged in a tandem arrangement). Each of the print engines 76 includes a photoconductor drum 78, a charger 80 that charges the photoconductor drum 78, an optical scanner 82 that forms an electrostatic latent image on the photoconductor drum 78 by scanning the photoconductor drum 78 with a light beam modulated in accordance with printing data of the corresponding color component, a developing device 84 that develops the electrostatic latent image formed on the photoconductor drum 78 to thereby form a toner image, and a primary transfer device 86 that transfers (primarily transfers) the toner image formed on the photoconductor drum 78 onto the intermediate transfer belt 88. The toner images of each color component that have been formed by the individual print engines 76 are superimposed on each other on the intermediate transfer belt 88, whereby a color toner image is formed on the intermediate transfer belt 88.

The color toner image that has been formed on the intermediate transfer belt 88 is transferred (secondarily transferred) by a secondary transfer device 90 onto the recording paper that has been conveyed from the feeder module 64 at a predetermined timing. The recording paper onto which the color toner image has been transferred is conveyed along a conveyance path 92 to a fuser 94, the toner image is fused and fixed to the recording paper by the fuser 94, and the recording paper is delivered to a paper discharger 96 of the output module 68 (the recording paper may be delivered to the paper discharger 96 after being held temporarily in a paper discharge unit (a stacker) 98) and is discharged to the outside after final processing has been performed as needed. When two-sided printing is performed, the recording paper to whose one side the toner image has been fixed (on whose one side the color image has been printed) is again fed from the paper discharge unit 98 to the conveyance path 92 in an inverted state via an inversion path 100 and an inversion conveyance path 102 of the image formation module 60. The image formation core unit 70 also includes an electrical system control housing unit 104 that houses electric circuits that control the operation of the individual print engines 76 and power supply circuits for each module.

Although detailed description will be omitted, the plate making apparatus 24 may employ a configuration that makes a printing plate (plate) of a particular color component by, for example, wrapping a sheet-like printing plate around, and fixing the sheet-like printing plate to, the outer peripheral surface of a cylindrical rotating drum, recording an image on the printing plate by causing the rotating drum to rotate and irradiating the printing plate integrally rotating with the rotating drum with a light beam modulated in accordance with inputted printing data of a particular color component, and thereafter developing the printing plate on which the image has been recorded. In this case, printing plates corresponding to each color component can be obtained by repeating the above-described process in regard to each color component of C, M, Y, K. The printing plates of each color component that have been made by the plate making apparatus 24 are set in the printing machine 22 and used for printing.

In the printing system 10, a user can instruct printing online from the terminal device 36 with respect to the image formation apparatus 12 and the plate making apparatus 24. Moreover, the user can select whether to perform printing using the image formation apparatus 12 or whether to perform printing using the plate making apparatus 24 (i.e., to make a printing plate with the plate making apparatus 24, set in the printing machine 22 the printing plate that has been made, and perform printing). In printing using the image formation apparatus 12, work such as creating a printing plate and setting the created printing plate in the printing machine is unnecessary, and printing is completed in a short amount of time after instructing printing (the printing speed is about 60 sheets per minute). However, there is a limit on the size of printable recording paper (ordinarily A3 size or smaller), so the image formation apparatus 12 is utilized when printing a relatively small quantity of plural types of printed matter of a predetermined size or smaller. Further, the image formation apparatus 12 is also utilized when the user desires to check an image represented by print image data used for making a printing plate prior to the plate making by the plate making apparatus 24. In printing using the plate making apparatus 24, the plate making by the plate making apparatus 24 takes a relatively long amount of time (e.g., about several minutes per one printing plate), and it also takes effort to set in the printing machine the printing plate that has been made. However, printing can be performed at a high speed (e.g., several hundred sheets per minute) once the printing plate is set into the printing machine, and the limit on the size of printed matter is also lenient. For that reason, the plate making apparatus 24 is utilized when printing large-size printed matter or when printing a large quantity of a few types of printed matter.

The terminal device 36 may be a personal computer (PC) and includes a main device 38 that has built therein a CPU 38A, a memory 38B, a nonvolatile storage unit 38C formed of a HDD or a flash memory, and a communication interface unit 38D. The main device 38 is connected to the communication line 46 via the communication interface unit 38D. A display 40, a keyboard 42 and a mouse 44 are connected to the main device 38. An operating system (OS) and application software for creating a printing target document are installed in the storage unit 38C.

In the present exemplary embodiment, the user may create a printing target document by operating the terminal device 36 and utilizing the application software. This document may be a text document, an image such as a photograph or a graphic, or a document in which text and images are mixed. When creation of the printing target document is completed, the user may perform an operation that instructs printing of the printing target document. In this operation, parameters stipulating the type (the image formation apparatus 12 or the printing machine 24) of printing device and printing conditions such as the number of prints to be made and the size and the paper quality of the printed matter are also designated. When this operation is performed by the user, printing control information (data) that represents, in a predetermined format (e.g., job definition format (JDF)), the printing conditions that have been set by the user is generated. The generated printing control data is transmitted from the terminal device 36 to the printing server 26 together with printing data in which the printing target document is described by page description language (PDL).

Next, the printing server 26 will be described. The printing server 26 includes a server device 28 that has built therein a CPU 28A, a memory 28B, a nonvolatile storage unit 28C formed of a HDD or a flash memory, and a communication interface unit 28D. The printing server 26 is connected to the communication line 46 via the communication interface unit 28D. A display 30, a keyboard 32 and a mouse 34 are connected to the server device 28. A printing data generation program for causing the printing server 26 to function as a print image data generator 50 (see FIG. 3; described later) and a moiré determination program (for performing later-described moiré determination processing with the CPU 28A) for causing the printing server 26 to function as a moiré determination unit 110 (see FIG. 3; described later) are installed in the storage unit 28C.

As shown in FIG. 3, the print image data generator 50, which is realized as a result of the printing data generation program being executed by the CPU 28A, includes a data storage unit 52, a RIP processor for plate making (plate making RIP processor) 54A, a RIP processor for printer (printer RIP processor) 54B, an image processor 56, and interface units 58A and 58B. Printing data (that are described by PDL and whose colors are expressed by R, G, B) that the printing server 26 has received from the terminal device 36 are sequentially stored in the data storage unit 52. A PDL interpreter and a RIP engine are incorporated in each of the RIP processors 54A and 54B.

The print image data generator 50 recognizes the type of printing device (the plate making apparatus 24 or the image formation apparatus 12) by referencing the printing control data. When the recognized device type is the plate making apparatus 24, the plate making RIP processor 54A is activated, and when the recognized device type is the image formation apparatus 12, the printer RIP processor 54B is activated. When the plate making RIP processor 54A is activated, the RIP processor 54A retrieves and interprets the printing data from the data storage unit 52 and performs, in page units, color conversion from R, G, B to C, M, Y, K and rendering into raster image data (bitmap data) by halftone dot processing. Thus, the plate making RIP processor 54A performs raster image (RIP) processing that generates print image data of a format usable in printing by the plate making apparatus 24 (e.g., a binary/high resolution format whose resolution is relatively high (e.g., 2400 dpi) and which expresses 1 pixel (1 dot) by 1 bit of each of C, M, Y, K). In the halftone dot processing by the plate making RIP processor 54A, a 175 line (175 lpi: 175 lines per inch) screen, for example, is used.

When the printer RIP processor 54B is activated, the RIP processor 54B retrieves and interprets the printing data from the data storage unit 52 and performs, in page units, color conversion from R, G, B to C, M, Y, K and rendering into raster image data (bitmap data). Thus, the printer RIP processor 54B performs RIP processing that generates print image data of a format usable in printing by the image formation apparatus 12 (e.g., a multi-value/low resolution format whose resolution is relatively low (e.g., 1600 dpi) and which expresses gradation of 1 pixel in plural bits (e.g., 8 bits) of each of C, M, Y, K). When the later-described moiré determination processing is performed with respect to printing data where the plate making apparatus 24 has been set as the type of printing device, the RIP processors 54A and 54B are activated and RIP processing is performed by the RIP processors 54A and 54B.

The RIP processors 54A and 54B reference the printing control data corresponding to the printing data retrieved from the data storage unit 52, judge the printing conditions, and perform, together with RIP processing, necessary image processing on the basis of the judged printing conditions. Examples of image processing which may be performed together with the RIP processing by the plate making-use RIP processing 54A include imposition, which assigns plural pages of images onto a large-size printing surface corresponding to large-size recording paper. Examples of image processing which may be performed together with the RIP processing by the printer RIP processor 54B include rotation, assignment of plural pages of images into one sheet of paper, repeat processing, paper size fitting, color management system (CMS) processing that corrects device differences, resolution conversion, and contrast adjustment.

When RIP processing has been performed by the plate making RIP processor 54A, the plate making RIP processor 54A outputs to the interface unit 58A the print image data that have been obtained via the above-described processing. In this case, the print image data are sequentially transferred to the plate making apparatus 24 by the interface unit 58A and are used in printing (creation of a printing plate) by the plate making apparatus 24. When RIP processing has been performed by the printer RIP processor 54B, the printer RIP processor 54B outputs to the image processor 56 the print image data that have been obtained via the above-described processing.

The image processor 56 references the printing control data corresponding to the print image data that have been outputted to the image processor 56 from the printer RIP processor 54B, judges the printing conditions, and performs image processing corresponding to the judged printing conditions. That is, the image processor 56 is equipped with the function of performing various types of processing, such as rotating images, adjusting image positions on sheets of paper, and enlargement or reduction, with respect to the inputted print image data. Depending on discharge conditions that are set in the printing control data and on the structure and characteristics of the image formation apparatus 12 that performs printing, the image processor 56 performs various types of different processing such as rearranging pages in ascending order or descending order, deciding the processing page order at the time of two-sided printing, calibration processing such as color conversion using a multidimensional lookup table, gray balance correction and color shift correction, screen designation processing, page rearrangement (stapler or punch hole place securement) corresponding to finishing processing executed by the finisher module of the image formation apparatus 12, collation, discharge surface (vertical) alignment, etc. The print image data on which the various types of processing have been performed by the image processor 56 are transferred to the image formation apparatus 12 via the interface unit 58B and are used in the printing by the image formation apparatus 12.

The moiré determination unit 110, which is realized as a result of the moiré determination program being executed by the CPU 28A and performs the moiré determination processing described next, includes a value multiplexer/resolution converter 112, pixel number adjusters 114A and 114B, smoothing processors 116A and 116B, a determination-use image generator 118, an enhancement processor 120, a color separation/imposition processor 122, a moiré pixel counter 124, and a moiré determination display unit 126. Processing by each functional block configuring the moiré determination unit 110 will be described later.

Next, an operation of the first exemplary embodiment will be described. In the printing system 10, binary image data for plate making (print image data used in printing by the plate making apparatus 24) are generated as a result of RIP processing including halftone dot processing being performed by the plate making RIP processor 54A on the basis of printing data that the printing server 26 has received from the terminal device 36. At this time, there is the potential for moiré to occur in the binary image data for plate making when a spatial frequency component approximating the pitch of the screen (e.g., 175 lines per inch if it is a 175 line screen) used in halftone dot processing or a spatial frequency component that is higher than this pitch is included in the original image (the image represented by the printing data).

Figure 4A:
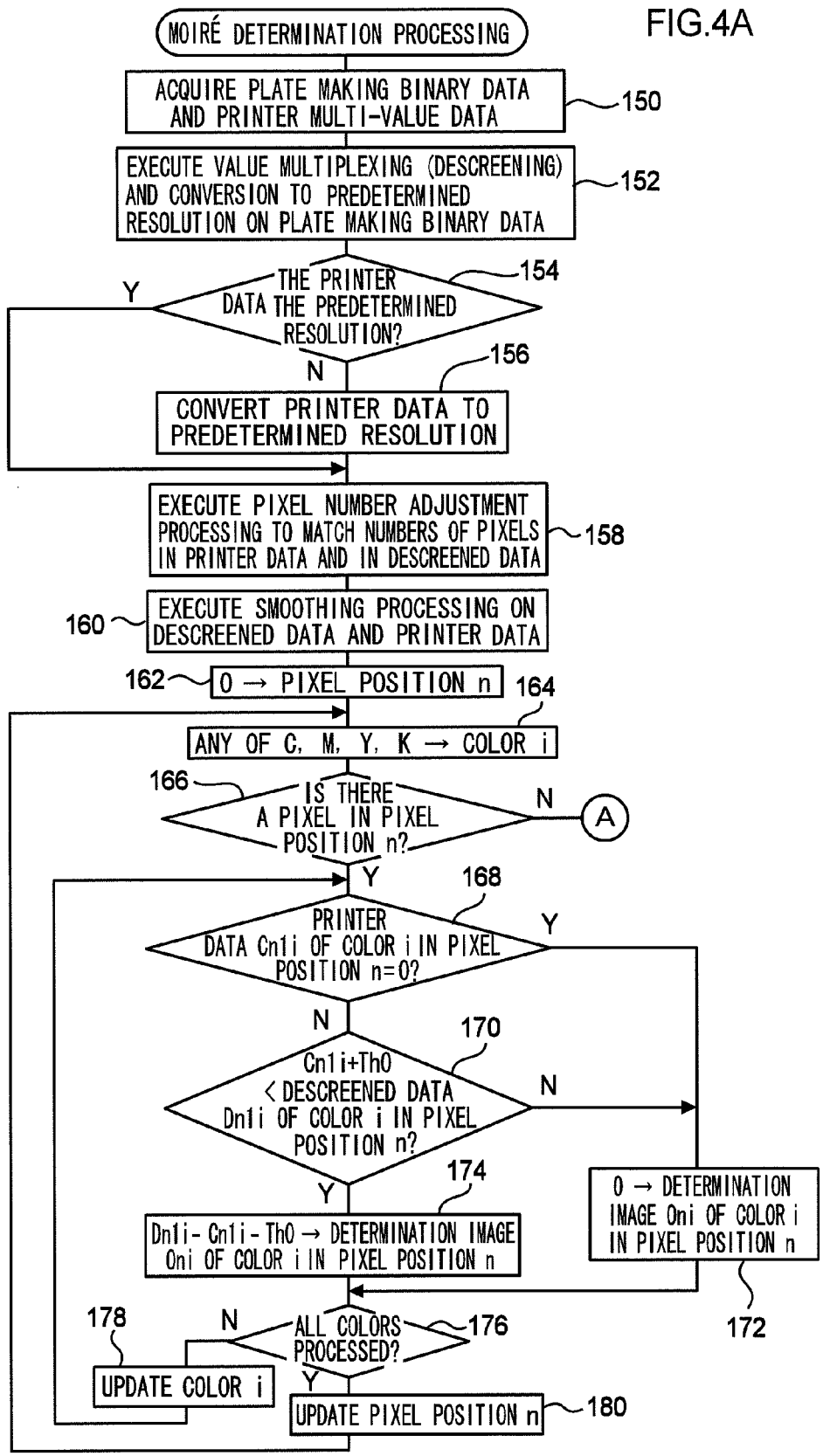
FIGS. 4A and 4B are flowcharts showing a flow of moiré determination processing pertaining to the first exemplary embodiment.
Figure 4B:
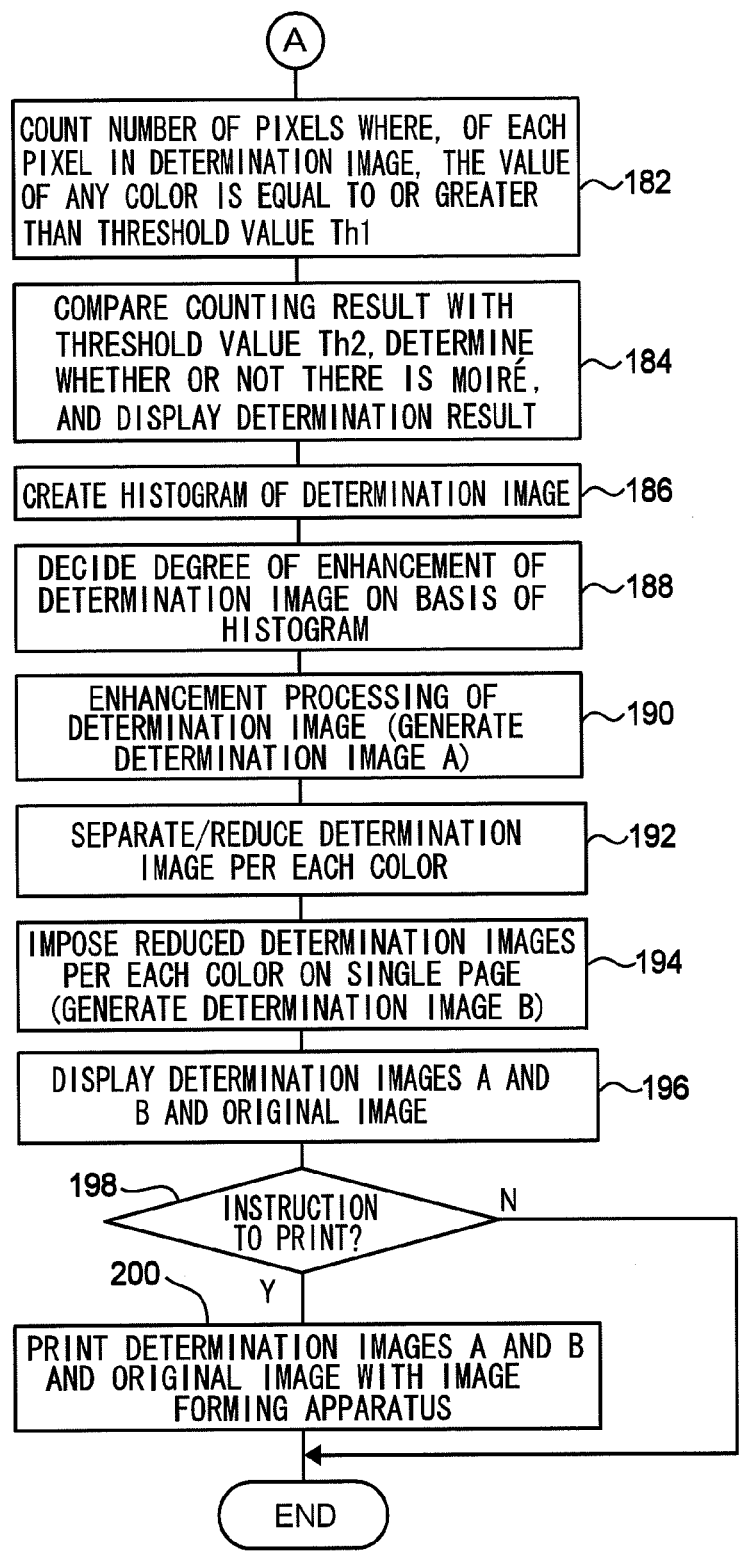

In the present exemplary embodiment, the moiré determination program for determining whether or not moiré is occurring in the binary image data for plate making is stored in the storage unit 28C of the printing server 26. When the user desires to check whether or not moiré is occurring in the binary image data for plate making, the user instructs the printing server 26 to determine whether or not there is moiré with respect to the binary image data for plate making via the terminal device 36 before performing creation of a printing plate with the plate making apparatus 24 using the binary image data for plate making that have been generated. Using this instruction as a trigger, the printing server 26 performs the moiré determination processing shown in FIGS. 4A and 4B by executing the moiré determination program by the CPU 28A.

In the moiré determination processing, first, in step 150, the processing acquires binary data for plate making (plate making binary data), which is a target of the moiré determination, from the plate making RIP processor 54A. Then, the printer RIP processor 54B performs RIP processing on the basis of the same printing data as the printing data that was used to generate the plate making binary image data. The processing acquires, from the printer RIP processor 54B, multi-value data for printer (print image data usable in printing by the image formation apparatus 12: an example of "comparison-use second image data") that have been generated by this RIP processing.

In step 152, with respect to the target plate making binary data acquired from the plate making RIP processor 54A in step 150, conversion (descreening) to multi-value data that express gradations with plural bits (e.g., 8 bits) for each of C, M, Y, K per one pixel and conversion to a predetermined resolution are performed. When moiré had occurred in the target plate making binary data, the moiré also remains in the data after conversion regardless of the descreening. As the resolution, a resolution of 1/n (n is an integer) with respect to the resolution of the plate making binary data can be adopted. For example, if the resolution of the plate making binary data is 2400 dpi, 600 dpi (n=4), 800 dpi (n=3) or 1200 dpi (n=2) can be applied as the resolution. Taking into consideration the precision of moiré determination using a later-described determination image, the resolution may preferably be equal to or higher than 600 dpi in terms of practicality.

In step 154, a determination is made as to whether or not the resolution of the printer multi-value data acquired from the printer RIP processor 54B in step 150 matches the predetermined resolution (the resolution of the data that have undergone the descreening and resolution conversion of step 152). The data that have undergone the descreening and resolution conversion of step 152 are an example of "first image data of a determination target"; hereinafter, this data will be called descreened data. When the determination of step 154 is positive, the processing moves to step 158, but when the determination of step 154 is negative (for example, when the predetermined resolution is 600 dpi, 800 dpi or 1200 dpi and the resolution of the printer multi-value data is 360 dpi or 720 dpi), the processing moves to step 156, where conversion to the predetermined resolution is performed with respect to the printer multi-value data.

In step 158, comparison of the numbers of vertical and horizontal pixels in the printer multi-value data and the descreened data is made, and when the numbers of pixels in both do not match, pixel number adjustment processing is performed by which the numbers of vertical and horizontal pixels in both are made to match by adding, in correspondence to the amount by which the numbers of pixels are deficit, pixel rows of white pixels where C, M, Y, K=0 to the data having the fewer number of pixels of the printer multi-value data and the descreened data. Due to step 154 to step 158, the resolution of, and the numbers of vertical and horizontal pixels in, the printer multi-value data and the descreened data are made to match.

In step 160, smoothing processing is performed with respect to the descreened data and the printer multi-value data. This smoothing processing can be realized, for example, by using a local mean filter to perform averaging processing, which takes the mean value of all pixels in a local region including a center pixel as the value of the center pixel (other filters, such as a local weighted mean filter or a median filter, may be used instead of a local mean filter). In the present exemplary embodiment, the size (also called order) of the local mean filters used in the smoothing processing with respect to the descreened data and the smoothing processing with respect to the printer multi-value data are different.

That is, since the plate making binary data are generated as a result of RIP processing including halftone dot processing being performed, there is the potential for dots whose maximum pitch is the pitch on the descreened data of the screen used in halftone dot processing and which repeatedly appear to remain as screen noise in the descreened data. For this reason, in the present embodiment, the size of the local mean filter used in the smoothing processing with respect to the descreened data is larger than the pitch on the descreened data of the screen used in the halftone dot processing (the size of the unit region on the first image data) and smaller than the period of the moiré on the descreened data.

Specifically, assuming, for example, that the resolution of the plate making binary data is 2400 dpi, the screen used in halftone dot processing is 175 lpi, and the resolution of the descreened data is 600 dpi. In this case, the pitch on the descreened data of the screen is 3.4 pixels, and the period of the moiré on the descreened data whose resolution is 600 dpi is about 40 to 50 pixels. Therefore, for example, a size of 5 pixels×5 pixels to 13 pixels×13 pixels may be used as the local mean filter used in the smoothing processing with respect to the descreened data. By using a local mean filter of this size, the moiré remaining in the descreened data is preserved while the screen noise remaining in the descreened data is removed.

Further, by using a local mean filter of a relatively large size as described above to perform the smoothing processing with respect to the descreened data, the edge (precipitous value change) in the descreened data also becomes dull. If the edge in the printer multi-value data is also made dull by using a local mean filter of a relatively large size to perform the smoothing processing also with respect to the printer multi-value data, the resultant determination image may fluctuates in generating the determination image which will be described later, such that pixels corresponding to the edge being erroneously extracted or not extracted as pixels corresponding to the moiré. This is because of a slight difference in the degree of dullness of the edge in the descreened data and the degree of dullness of the edge in the printer multi-value data.

For this reason, in the present exemplary embodiment, the size of the local mean filter used in the smoothing processing with respect to the printer multi-value data is made smaller than the size of the local mean filter used in the smoothing processing with respect to the descreened data. Specifically, for example, when the resolution of the printer multi-value data is 600 dpi, a size of about 3 pixels×3 pixels is used as the local mean filter used in the smoothing processing with respect to the printer multi-value data. Images in which significant moiré occur are often images such as photo images that have been captured by a digital still camera. However, when a local mean filter of the size described above is used to perform the smoothing processing with respect to the printer multi-value data, noise caused by an imaging device such as a CCD of the digital still camera is removed from the printer multi-value data while the edge in the printer multi-value data is preserved virtually without becoming dull.

In step 162 to step 180, generation of a determination image for determining moiré is performed using the descreened data and the printer multi-value data that have undergone smoothing processing in step 160. That is, first, in step 162, a variable n representing the position of a processing target pixel in the image is initialized to 0. In step 164, a value representing any of C, M, Y, K is set to a variable i representing a processing target color. In step 166, a determination is made as to whether or not there is a pixel in the pixel position (pixel position n) represented by the variable n in the images represented by the descreened data and the printer multi-value data.

When the determination is positive, the processing moves to step 168, where a determination is made as to whether or not a value $Cn1i$ of color i of the pixel in pixel position n of the printer multi-value data is 0 (a second value). When this determination is negative, the program moves to step 170, where a determination is made as to whether or not the sum of the value $Cn1i$ and a preset determination threshold value Th0 (a first value) is smaller than a value $Dn1i$ of color i of the pixel in pixel position n of the descreened data. When the determination of step 168 is positive or when the determination of step 170 is negative, the program moves to step 172, in which a value Oni of color i of the pixel in pixel position n in the determination image is set to 0 (a third value), and then the processing moves to step 176. When the determination of step 170 is positive, the program moves to step 174, in which the difference between the value $Dn1i$ and both the value $Cn1i$ and the determination threshold value Th0 (i.e., a value corresponding to the difference between the value of the first image data and the value of the second image data) is set as the value Oni, and then the processing moves to step 176.

In step 176, a determination is made as to whether or not it the processings of step 168 to step 174 have been performed with respect to all colors of C, M, Y, K of the pixel in pixel position n. When the determination is negative, the processing moves to step 178, where a value representing the unprocessed color of C, M, Y, K is set for the variable i. When after step 178, the processing returns to step 168 and repeats step 168 to step 178 until the determination of step 176 becomes positive. When step 168 to step 174 are performed with respect to all colors of C, M, Y, K of the pixel in pixel position n, the determination of step 176 is positive and the processing moves to step 180, where the variable n is updated (e.g., increments by 1), and thereafter the processing returns to step 164. Thus, step 164 to step 180 are repeated until the determination of step 166 becomes negative, and the processing of step 168 to step 174 is performed per each color of C, M, Y, K in regard to all pixels in the image represented by the descreened data and in the image represented by the printer multi-value data.

Figure 5A:
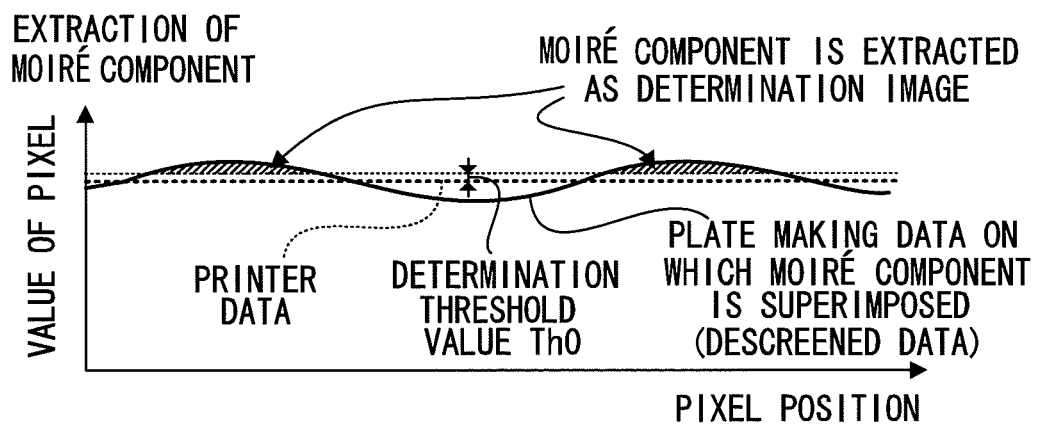
FIG. 5A is a line graph describing the extraction of a moiré component in the generation of a determination image.

The processing of step 168 to step 174 will be further described with reference to FIG. 5A and FIG. 5B. As mentioned earlier, moiré of the plate making binary image data occurs in the RIP processing including halftone dot processing being performed by the plate making RIP processor 54A. When moiré had occurred in the original plate making binary image data, the moiré also remains in the descreened data generated from the plate making binary data. However, so moiré does not occur in the printer multi-value data because halftone dot processing is not performed on the printer multi-value data in the RIP processing performed by the printer RIP processor 54B, and the resolution of the printer multi-value data also differs from that of the plate making binary image data. For this reason, when moiré remains in the descreened data, in the images represented by the descreened data and the printer multi-value data, in a region where the value of each pixel is constant or where the change in the value of each pixel is small, as shown in FIG. 5A, each pixel of the printer multi-value data shows an approximately constant value while the value of each pixel of the descreened data shows a change where it fluctuates periodically because of the remaining moiré.

In the processing of step 168 to step 174, when the value $Dn1i$ of the descreened data is equal to or less than the sum of the value $Cn1i$ of the printer multi-value data and the determination threshold value Th0 (when the determination of step 170 is negative), the value $Oni$ of the determination image is set to 0 (step 172). Further, when the value $Dn1i$ is larger than the sum of the value $Cn1i$ and the threshold value Th0 (when the determination of step 170 is positive), the difference between the value $Dn1i$ and both the value $Cn1i$ and the threshold value Th0 is set as the value $Oni$ (step 174). Thus, as will also be understood from FIG. 5A, the moiré component superimposed on the descreened data is extracted as the determination image. Further, since the value $Dn1i$ is compared with the sum of the value $Cn1i$ and the threshold value Th0, even if noise were to remain without being removed from the descreened data and the printer multi-value data regardless of smoothing processing, adverse affects resulting from this noise are alleviated.

Figure 5B:
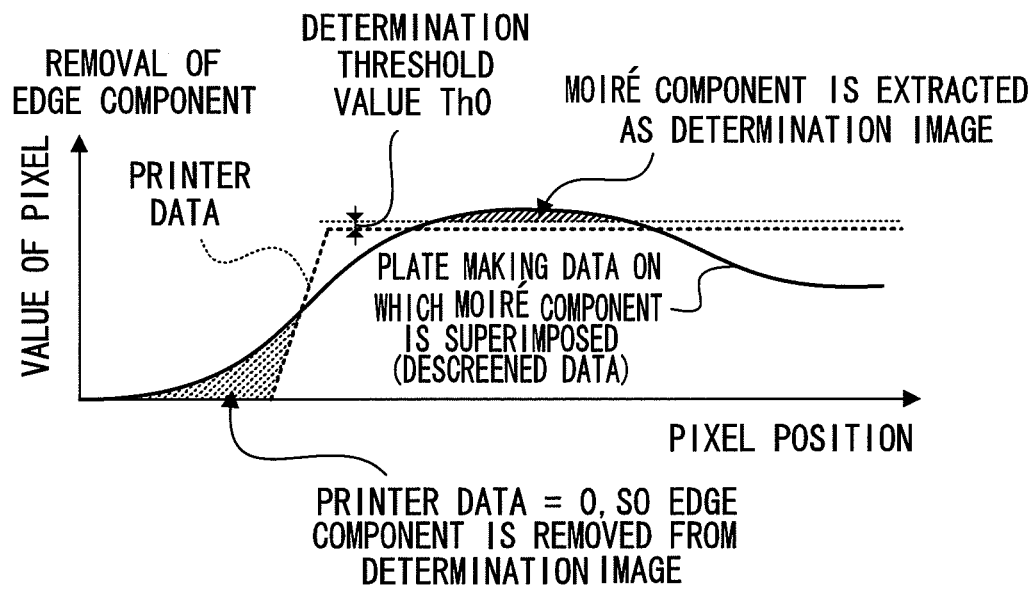
FIG. 5B is a line graph describing the removal of an edge component.

Further, because the smoothing processing with respect to the descreened data is performed using a local mean filter of a relatively large size, as shown in FIG. 5B, the change in the value of each pixel of the descreened data in the portion corresponding to the edge in the image is dulled. In contrast, because a local mean filter of a smaller size than that for the descreened data is used for the smoothing processing with respect to the printer multi-value data, as shown in FIG. 5B, the value of each pixel of the printer multi-value data changes more precipitously than the descreened data in the portion corresponding to the edge in the image.

With respect thereto, in the processing of step 168 to step 174, when the value $Cn1i$ is 0 (when the determination of step 168 is positive), the value $Oni$ is set to 0 (step 172). For that reason, as shown by the hatching indicated by dotted lines in FIG. 5B, the portion (edge component) corresponding to the edge in the image where the value $Dn1i$ is larger than the value $Cn1i$ is removed from the determination image. Consequently, due to the processing of step 168 to step 174, per each color of C, M, Y, K, a determination image is obtained in which a value corresponding to the amplitude of the moiré component has been set only for pixels (moiré pixels) corresponding to moiré occurring in the plate making binary image data and remaining in the descreened data, and the value has been set to 0 for pixels other than the moiré pixels.

When the processing of step 168 to step 174 in regard to each color of C, M, Y, K of all pixels in the image represented by the descreened data and in the image represented by the printer multi-value data is completed and the determination image is generated, the determination of step 166 is negative and the processing moves to step 182. In step 182, the value of each color of C, M, Y, K of each pixel in the determination image is compared with a preset determination threshold value Th1 the number of pixels where any value of each color of C, M, Y, K of each pixel in the determination image is equal to or greater than the threshold value Th1 is counted as the number of moiré pixels whose potential to correspond to moiré is high.

In step 184, the result of counting the moiré pixels in step 182 (the number of moiré pixels) is compared with a preset determination threshold value Th2 to determine whether or not there is moiré on the basis of whether or not the number of moiré pixels is equal to or greater than the threshold value Th2. Then, the result of moiré determination is transmitted to the terminal device 36 from which the instruction of the moiré determination came, and the result is displayed on the display 40 of the terminal device 36. Thus, whether or not moiré will occur when the target plate making binary data have been used to perform printing plate creation and printing is recognized by the user. Instead of displaying the result of the moiré determination on the display 40 of the terminal device 36, the display may be performed on the display 30 of the printing server 26.

In the steps subsequent to step 186, processing of visualizing the determination image is performed. As is apparent from FIG. 5A and FIG. 5B, the values of the moiré pixels in the determination image are valued corresponding to deviations between the descreened data and the printer multi-value data—that is, values corresponding to the amplitude of the moiré component. For that reason, even if the determination image is visualized as is, it would be difficult to view the moiré pixels and checking of the moiré would be difficult. Therefore, in step 186, a histogram of the determination image is generated, and in step 188, on the basis of the histogram generated in step 186, the degree of enhancement of the determination image (a coefficient with which the value of each color of each pixel in the determination image is multiplied) is determined such that the maximum value of the moiré pixels in the determination image is converted to a maximum value that can be taken in the data of the determination image (e.g., 255 if the data are data that allocate 8 bits for each C, M, Y, K per one pixel).

In step 190, enhancement processing that increases the difference of the value of each color of each pixel in the determination image is performed by multiplying the degree of enhancement (coefficient) determined in step 188 with the value of each color of each pixel in the determination image. Thus, a visible (easy-to-see) determination image (which will be called determination image A) is obtained on which the result of extracting the moiré pixels per each color of C, M, Y, K is superimposed.

In step 192, the determination image A obtained through enhancement processing is separated into determination images per each color of C, M, Y, K and reduces the determination images per each color of C, M, Y, K (four pages of determination images) by a reduction ratio with which the determination images are imposable on a single page. In step 194, a determination image B in which the determination images per each color reduced in step 192 are imposed on a single page is generated (i.e., a single image in which the determination images per each color to which enhancement processing has been administered are reduced and arrayed is generated). In step 196, the data of determination image A, the data of determination image B and the data of the original image (e.g., the printer multi-value data or the like are used) are transmitted to the terminal device 36 from which the instruction of the moiré determination came, and the determination image A, the determination image B and the original image are displayed on the display 40 of the terminal device 36.

For example, if the image represented by the descreened data is displayed on the display to check for moiré, it would be difficult to display at one time the entire image represented by the descreened data with the same resolution as the resolution during printing using a printing plate. In this case, a user would have to repeatedly display a part of the image represented by the descreened data on the display and check for moiré in the displayed part, while scrolling over the part of the image represented by the descreened data that is displayed on the display. Further, since the principle of displaying an image on a display is completely different from that of printing an image using a printing plate, even if the image represented by the descreened data is displayed as is on a display, the visibility of the moiré would be significantly lower than in an image that has been printed using a printing plate.

In contrast, the determination image A is an image where the moiré component has been extracted from the descreened data and to which enhancement processing has been performed. Therefore, even when the entire determination image A is reduced and displayed on a display, the moiré component superimposed on the descreened data is clearly displayed without being affected by resolution, output scale factor or differences in principles of image output. Further, when a region where moiré of plural colors is superimposed had existed in the image, the clarity of display of the moiré component in that region drops on the determination image A. However, since the determination image B is configured such that the determination images per each color of C, M, Y, K being imposed on a single page, moiré of plural colors in that region is separated per each color and displayed in the determination image per each color configuring the determination image B.

In step 198, a determination is made as to whether or not printing of a determination image or the like has been instructed. When the determination is negative, the moiré determination processing is terminated. When the determination of step 198 is positive as a result of printing of a determination image or the like being instructed by the user via the terminal device 36, the processing moves to step 200. In step 200, the data of the determination image A, the data of the determination image B and the data of the original image is transmitted to the image formation apparatus 12 via the interface unit 58B, the determination image A, the determination image B and the original image are printed on recording paper by the image formation apparatus 12, and thereafter the moiré determination processing is terminated.

For example, when the image represented by the descreened data is printed on a recording paper by the image formation apparatus 12, the principle of printing, the printing agent, and the resolution differ from those in the printing of an image using a printing plate. For that reason, the visibility of moiré in the image that has been printed on a recording paper by the image formation apparatus 12 is significantly lower than that in an image that has been printed using a printing plate. In contrast, the determination image A is, as mentioned earlier, an image where the moiré component has been extracted from the descreened data and to which enhancement processing has been performed. Therefore, even when this determination image A is printed on a recording paper by the image formation apparatus 12, the moiré component superimposed on the descreened data is clearly displayed without being affected by differences in the principle of printing, the printing agent or resolution. Further, even if a region where moiré of plural colors is superimposed had existed in the image, the moiré of plural colors in that region is separated per each color and displayed on the determination images per each color of the determination image B that has been printed on recording paper by the image formation apparatus 12.

Second Exemplary Embodiment

Next, a second exemplary embodiment will be described. The same reference numerals will be given to portions that are the same as those in the first exemplary embodiment, and description thereof will be omitted. As shown in FIG. 6, the moiré determination unit 110 pertaining to the second exemplary embodiment differs from the moiré determination unit 110 of the first exemplary embodiment in that it includes an edge enhancement processor 128. The printer multi-value data outputted from the pixel number adjuster 114A and printer multi-value data outputted from the edge enhancement processor 128 are also inputted to the determination image generator 118, as well as the printer multi-value data outputted from the smoothing processor 116A and the descreened data outputted from the smoothing processor 116B.

Only those portions of the moiré determination processing pertaining to the second exemplary embodiment that differ from the moiré determination processing described in the first exemplary embodiment (FIGS. 4A and 4B) will be described with reference to FIGS. 7A and 7B. In the moiré determination processing of the second exemplary embodiment, after the smoothing processing is performed in step 160 with respect to the printer multi-value data and the descreened data that have undergone the pixel number adjustment processing, in step 161, edge enhancement processing is performed with respect to the printer multi-value data subjected to the pixel number adjustment processing. In the second exemplary embodiment, the printer multi-value data that have undergone the smoothing processing of step 160 will hereinafter be called "smoothed printer multi-value data" (third image data).

The edge enhancement processing in step 161 can be realized by processing such as using an edge extraction filter such as a differential filter, for example, to extract the edge component from the printer multi-value data that have undergone pixel number adjustment processing, multiplying the extracted edge component with a preset coefficient, and adding the product to the original printer multi-value data. Thus, image data is obtained where the edge has been enhanced with respect to the printer multi-value data that have undergone pixel number adjustment processing. The printer multi-value data that have undergone the edge enhancement processing of step 161 will hereinafter be called "edge-enhanced printer multi-value data" (fourth image data).

Further, in the moiré determination processing of the second exemplary embodiment, in step 168, a determination is made as to whether or not the value $Cn1i$ of color i of the pixel in pixel position n of the printer multi-value data that have undergone pixel number adjustment processing (the printer multi-value data that are outputted from the pixel number adjuster 114A in FIG. 6) is 0. When the determination is negative, the processing moves to step 169, where the maximum value of the value $Cn1i$ of color i of the pixel in pixel position n of the printer multi-value data, a value $Cn2i$ of color i of the pixel in pixel position n of the smoothed printer multi-value data and a value $Cn3i$ of color i of the pixel in pixel position n of the edge-enhanced printer multi-value data is set to a determination reference value Cm. In step 171, a determination is made as to whether or not the sum of a determination reference value Cm and the determination threshold value Th0 is smaller than the value $Dn1i$ of color i of the pixel in pixel position n of the descreened data.

When the determination of step 168 is positive or the determination of step 171 is negative, the processing moves to step 172, where the value Oni of color i of the pixel in pixel position n in the determination image is set to 0, and then the processing moves to step 176. When the determination of step 171 is positive, the processing moves to step 175, where the difference between the value Dn1i and both the value Cn2i and the threshold value Th0 (i.e., a value corresponding to the difference between the value of the first image data and the value of the third image data) is set as the value Oni, and then the processing moves to step 176. Processing from step 176 on is the same as that in the moiré determination processing of the first exemplary embodiment (FIGS. 4A and 4B), so description thereof will be omitted.

In the moiré determination processing pertaining to the second exemplary embodiment (FIGS. 7A and 7B), as mentioned above, the difference between the value Dn1i and both the value Cn2i and the threshold value Th0 is set as the value Oni of the determination image only when the value Dn1i of the descreened data is larger than the sum of the threshold value Th0 and the maximum value (the determination reference value Cm) of the value Cn1i of the printer multi-value data, the value Cn2i of the smoothed printer multi-value data and the value Cn3i of the edge-enhanced printer multi-value data. For that reason, the edge component is removed with better precision from the determination image in comparison to the moiré determination processing described in the first exemplary embodiment.

Third Exemplary Embodiment

Figure 8:
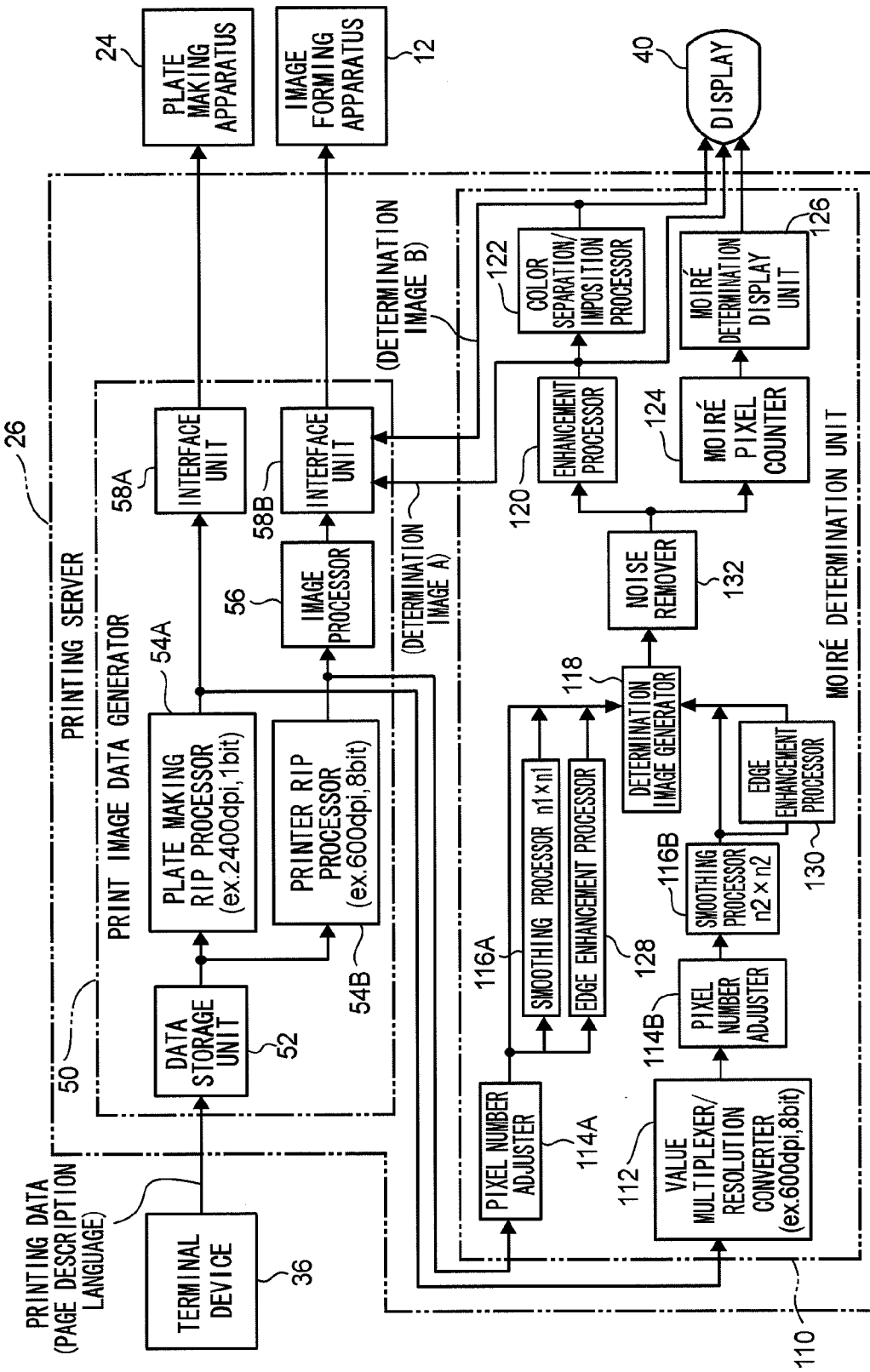
FIG. 8 is a functional block diagram of a printing server pertaining to a third exemplary embodiment.

Next, a third exemplary embodiment of the present invention will be described. The same reference numerals will be given to portions that are the same as those in the second exemplary embodiment, and description of those same portions will be omitted. As shown in FIG. 8, the moiré determination unit 110 pertaining to the third exemplary embodiment differs from the moiré determination unit 110 described in the second exemplary embodiment in that an edge enhancement processor 130 and a noise remover 132 are added. Descreened data that have been outputted from the edge enhancement processor 130 are also inputted to the determination image generator 118, as well as the printer multi-value data outputted from the pixel number adjuster 114A, the printer multi-value data outputted from the smoothing processor 116A, the printer multi-value data outputted from the edge enhancement processor 128 and the descreened data outputted from the smoothing processor 116B. Moreover, the determination image that has been generated by the determination image generator 118 undergoes noise removal processing by the noise remover 132 and is outputted to the enhancement processor 120 and the moiré pixel counter 124.

Next, an operation of the third exemplary embodiment will be described. As mentioned above, there is a potential for moiré to occur in the plate making binary data generated from the printing data by RIP processing (e.g., RIP processing by the plate making RIP processor 54A) including halftone dot processing. Moreover, as the density in the boundary portion (edge portion) between the image portion (high density portion) and the background portion (low density portion) in the image (original image) represented by the printing data becomes lower, the area ratio of the halftone dots in the image portion in the image represented by the plate making binary data drops, and the distance between the dots configuring the halftone dots becomes larger. Due thereto, a phenomenon arises where the change in the density (density change) in the edge portion in the image represented by the plate making binary data becomes duller than in the original image. If the original image is an image representing a text document, since the density in the edge portion is relatively high, the above-described phenomenon is difficult to see. However, when the original image is a photo image or an image in which a photo image and an image representing a text document are mixed, often the density in the edge portion within the photo image is lower than that of the image representing the text document. For that reason, the dullness of the density change in the edge portion in the image represented by the plate making binary data may be seen relatively remarkably.

Figure 10:
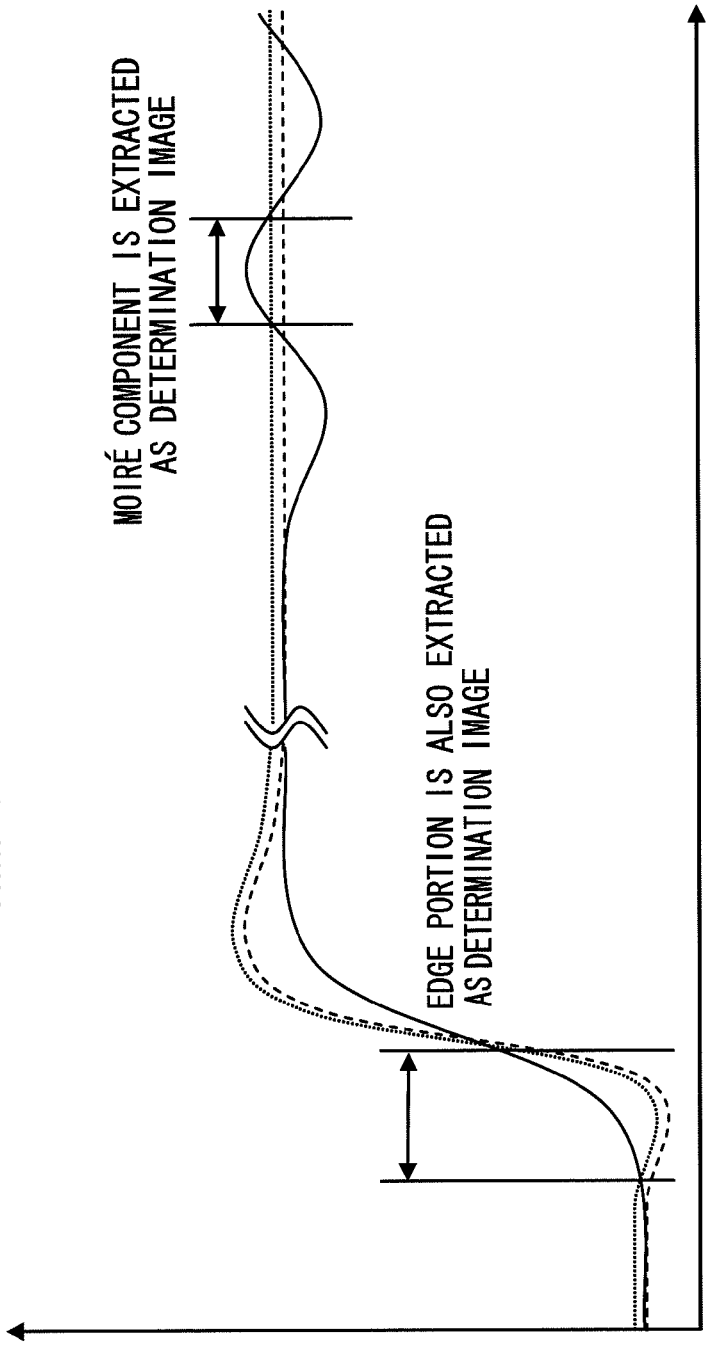
FIG. 10 is a line graph showing an example of change in each set of data in an edge portion of a photo image when the moiré determination processing pertaining to the first and second exemplary embodiments has been performed with respect to a photo image.

Therefore, when creating a printing plate of a photo image or an image in which a photo image and an image representing a text document are mixed by the plate making apparatus 24 and performing printing by the printing machine 22, often edge enhancement processing is performed beforehand with respect to the printing data by the terminal device 36, for example, in anticipation of the density change in the edge portion within the photo image of the plate making binary data becoming dull in accompaniment with the RIP processing. Thus, as indicated by the solid line in FIG. 10 for example, the dullness of the density change in the edge portion within the photo image of the plate making binary data after RIP processing is alleviated by the edge enhancement processing performed beforehand with respect to the printing data (note that although the solid line in FIG. 10 shows the density change in the edge portion within the photo image of the descreened data, the edge portion within the photo image of the binary data before descreening also shows the same change).

However, in RIP processing (e.g., RIP processing by the printer RIP processor 54B) that generates printer multi-value data from printing data, dullness of the density change in the edge portion within the photo image such as described above does not arise. Therefore, as indicated by the broken line in FIG. 10 for example, in the edge portion within the photo image of the printer multi-value data, the density changes precipitously because of the edge enhancement processing that has been performed with respect to the printing data. As is apparent by comparing the solid line with the broken line shown in FIG. 10, the density change in the edge portion within the photo image differs greatly between the descreened data and the printer multi-value data.

In the moiré determination processing previously described in the first and second exemplary embodiments, based on the fact that the density in the background portion in an image representing a text document is 0 or close to 0, 0 is set to the value Oni of color i of the pixel in pixel position n in the determination image when the value Cn1i of color i of the pixel in pixel position n of the printer multi-value data is 0 (i.e., when the determination of step S168 is positive). Thus, as shown also in FIG. 5B, the edge component corresponding to a change in density in the background portion side of the edge portion (i.e., a change in density such that the value Dn1i of the descreened data is higher than the value Cn1i of the printer multi-value data or the sum of the determination reference value Cm and the determination threshold value Th0) is removed from the determination image. However, in a photo image, the background portion also has density to a certain extent. Therefore, even when the above-described processing is applied to a photo image or an image in which a photo image and an images representing a text document are mixed, as shown in FIG. 10, the edge component corresponding to the density change in the background portion side of the edge portion within the photo image is not removed from the determination image. Further, when a value larger than 0 is used as the determination threshold value (second value) to be compared with the value Cn1i of the printer multi-value data, the precision of removing the edge component within the image representing the text document from the determination image drops.

Figure 9:
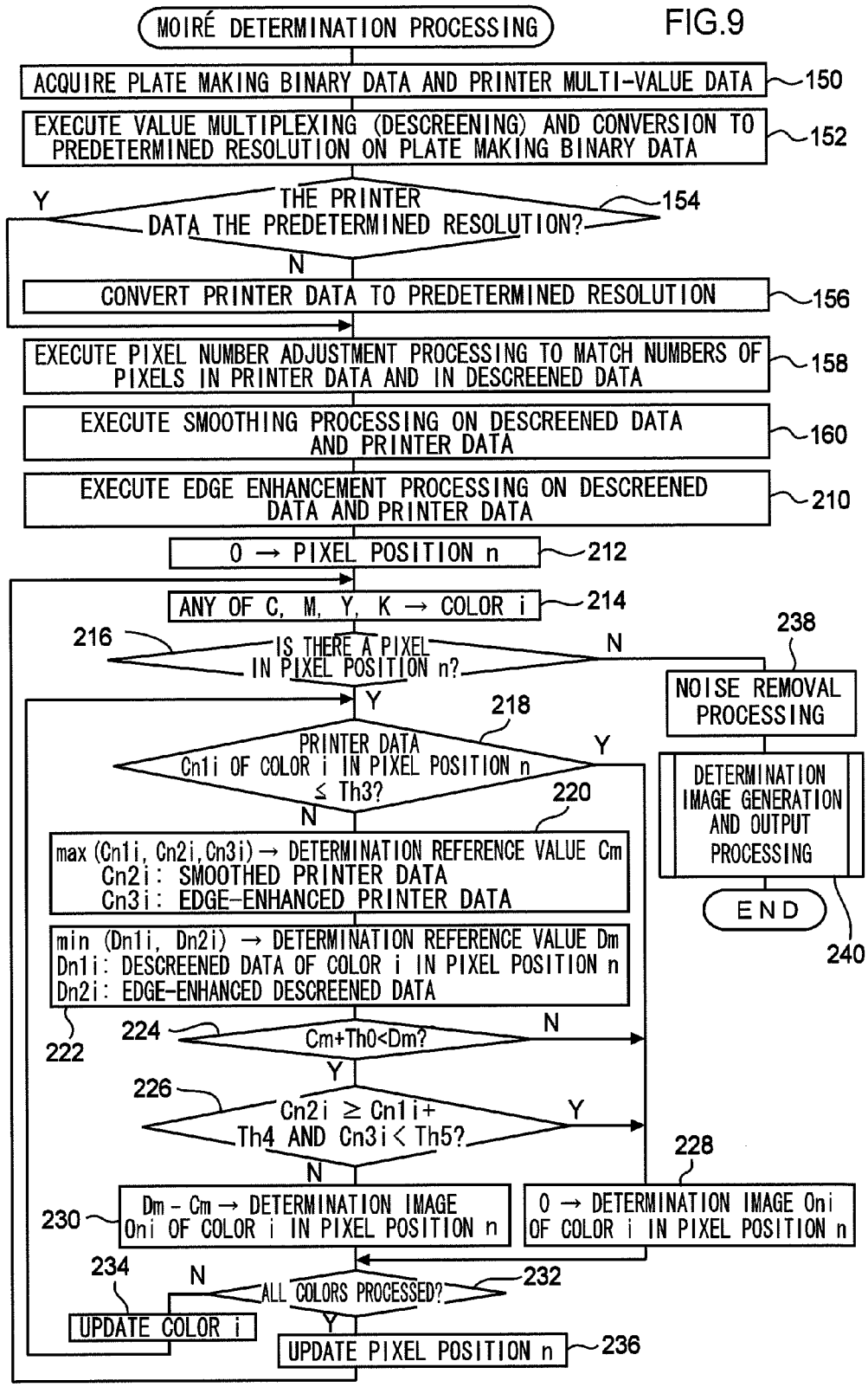
FIG. 9 is a flowchart showing a flow of moiré determination processing pertaining to the third exemplary embodiment.

In consideration of the above, in the third exemplary embodiment, the moirédetermination processing shown in FIG. 9 is performed. Below, only those portions of the moiré determination processing pertaining to the third exemplary embodiment that differ from the moiré determination processing of the second exemplary embodiment (FIGS. 7A and 7B) will be described. In the moiré determination processing of the third exemplary embodiment, the program performs smoothing processing in step 160 with respect to the printer multi-value data and the descreened data subjected to pixel number adjustment processing. Thereafter, in the next step 210, edge enhancement processing is performed with respect to the printer multi-value data that have undergone pixel number adjustment processing and also with respect to the descreened data that have undergone smoothing processing. The descreened data that have undergone the edge enhancement processing of step 210 will hereinafter be called "edge-enhanced descreened data" (fifth image data).

Figure 7B:
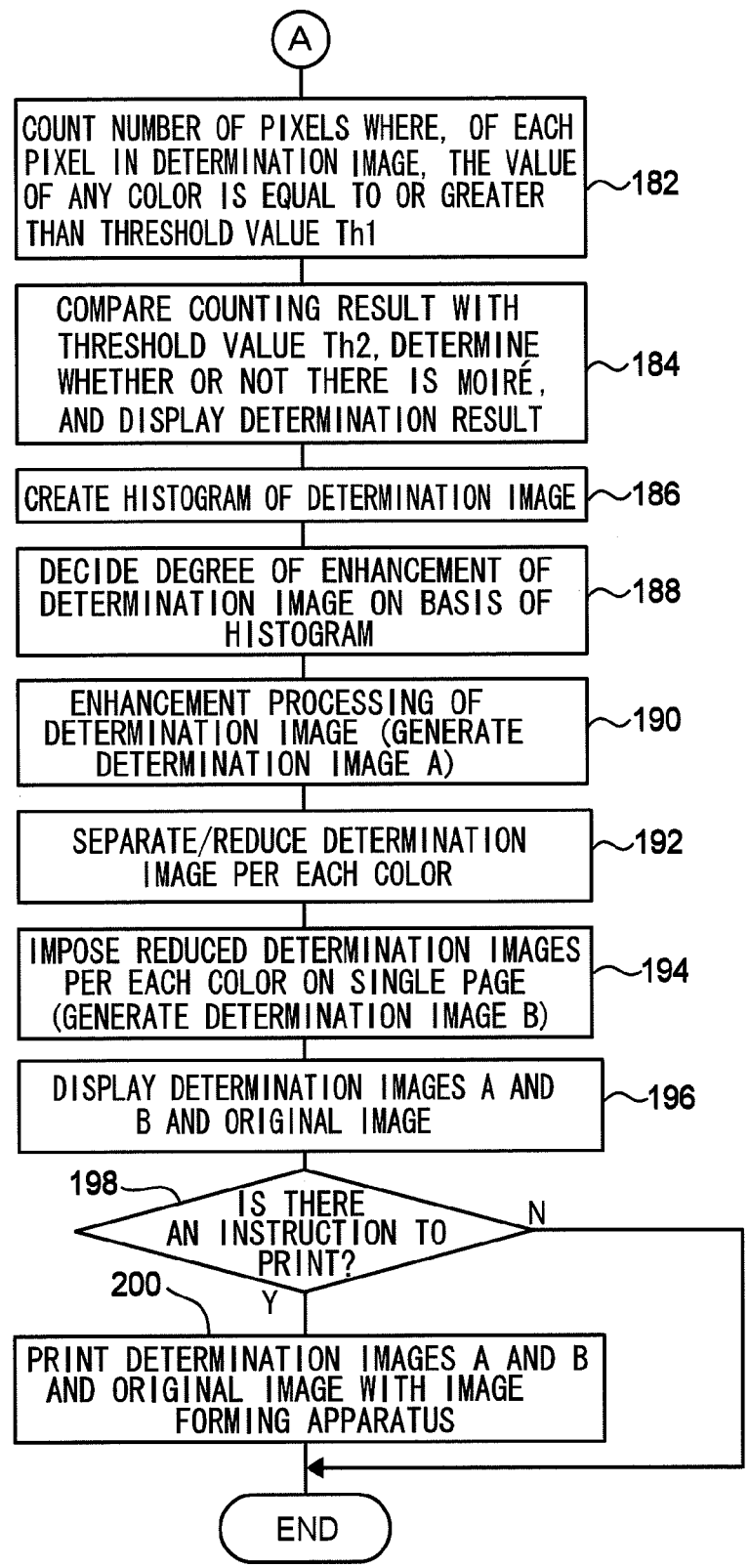

The edge enhancement processing with respect to the descreened data of step 210 can be realized in the same way as in step 161 described in the second exemplary embodiment (FIGS. 7A and 7B). That is, the edge enhancement processing can be realized by processing such as using an edge extraction filter such as a differential filter, for example, to extract the edge component from the descreened data that have undergone smoothing processing, multiplying the extracted edge component with a preset coefficient, and adding the product to the original descreened data. Thus, from the descreened data, as indicated by the bold solid line in FIG. 11 for example, image data (edge-enhanced descreened data) that show a change in value in the edge portion within the photo image similar to that of the printer multi-value data and in which the moiré component superimposed on the descreened data is preserved. The edge enhancement processing with respect to the descreened data of step 210 is a processing corresponding to the function of the edge enhancement processor 130 (see FIG. 8).

In the next step 212, the variable n is initialized to 0. In step 214, a value representing any of C, M, Y, K is set to the variable i. In step 216, a determination is made are to whether or not there is a pixel in pixel position n. When the determination of step 216 is positive, the processing moves to step 218; where a determination is made as to whether or not the value Cn1$i$ of color i of the pixel in pixel position n of the printer multi-value data is equal to or less than a preset determination threshold value Th3 (second value). As the determination threshold value Th3, 0 or a value close to 0 (e.g., a value of about 2 to 6% in terms of the percentage of the density value) can be set.

When the determination of step 218 is negative, the processing moves to step 220, where the maximum value of the value Cn1$i$ of color i of the pixel in pixel position n of the printer multi-value data, the value Cn2$i$ of color i of the pixel in pixel position n of the smoothed printer multi-value data and the value Cn3$i$ of color i of the pixel in pixel position n of the edge-enhanced printer multi-value data is set for a determination reference value Cm (seventh image data). Further, in the next step 222, the minimum value of the value Dn1$i$ of color i of the pixel in pixel position n of the descreened data and a value Dn2$i$ of color i of the pixel in pixel position n of the edge-enhanced descreened data is set for a determination reference value Dm (sixth image data).

In the next step 224, a determination is made as to whether or not the sum of the determination reference value Cm and the determination threshold value Th0 is smaller than the determination reference value Dm. When this determination is positive, the processing moves to step 226, where a determination is made as to whether or not the value Cn2$i$ is equal to or greater than the sum of the value Cn1$i$ and a preset determination threshold value Th4 (sixth value), and whether or not the value Cn3$i$ is smaller than a preset determination threshold value Th5 (seventh value).

When the determination of step 218 is positive or when the determination of step 224 is negative or when the determination of step 226 is positive, the processing moves to step 228, sets 0 as the value Oni of color i of the pixel in pixel position n in the determination image, and then moves to step 232. the value (=0) set for the value Oni in step 228 is an example of the third value. When the determination of step 218 is negative and the determination of step 224 is positive and the determination of step 226 is negative, the processing moves to step 230, where the difference between the determination reference value Dm and the determination reference value Cm is set to the value Oni (corresponding to "a value differing from the third value" or "a value corresponding to the difference between the value of the sixth image data and the value of the seventh image data"). Thereafter, the processing moves to step 232.

In step 232, a determination is made as to whether or not the processing of step 218 to step 230 has been performed with respect to all of the colors of C, M, Y, K of the pixel in pixel position n. When the determination is negative, a value representing the unprocessed color of C, M, Y, K is set for the variable i in step 234 and then the processing returns to step 218. Thus, the processing of step 218 to step 234 is performed with respect to all of the colors of C, M, Y, K of the pixel in pixel position n. Further, when the determination of step 232 is positive, the variable n is updated (e.g., incremented by 1) and thereafter the processing returns to step 214. Thus, the processing of step 218 to step 234 is performed per each color of C, M, Y, K with respect to all pixels in the image represented by the descreened data and in the image represented by the printer multi-value data. Step 212 to step 236 in the moiré determination processing of the third exemplary embodiment are processing corresponding to the function of the determination image generator 118 (see FIG. 8).

The processing of step 218 to step 234 will be described further with reference to FIG. 11 and FIG. 12. In the processing of step 218 to step 234, the maximum value of the value Cn1$i$, the value Cn2$i$ and the value Cn3$i$ is set to the reference value Cm (step 220), and the minimum value of the value Dn1$i$ and the value Dn2$i$ is set to the reference value Dm (step 222). The determination is made as to whether or not the sum of the reference value Cm and the threshold value Th0 is smaller than the reference value Dm (step 224) and, when this determination is negative, the value Oni is set to 0 (step 228).

Figure 11:
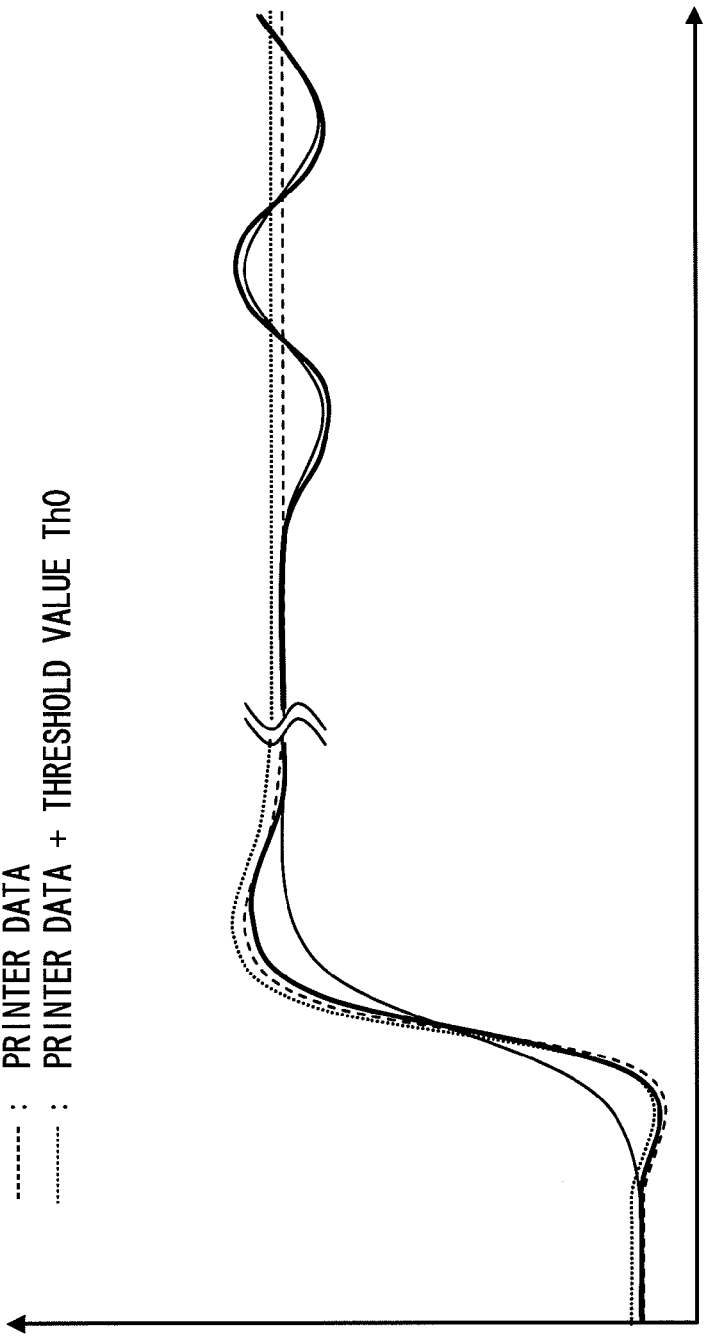
FIG. 11 is a line graph showing an example of change in each set of data in an edge portion of a photo image in the moiré determination processing pertaining to the third exemplar embodiment.
Figure 12:
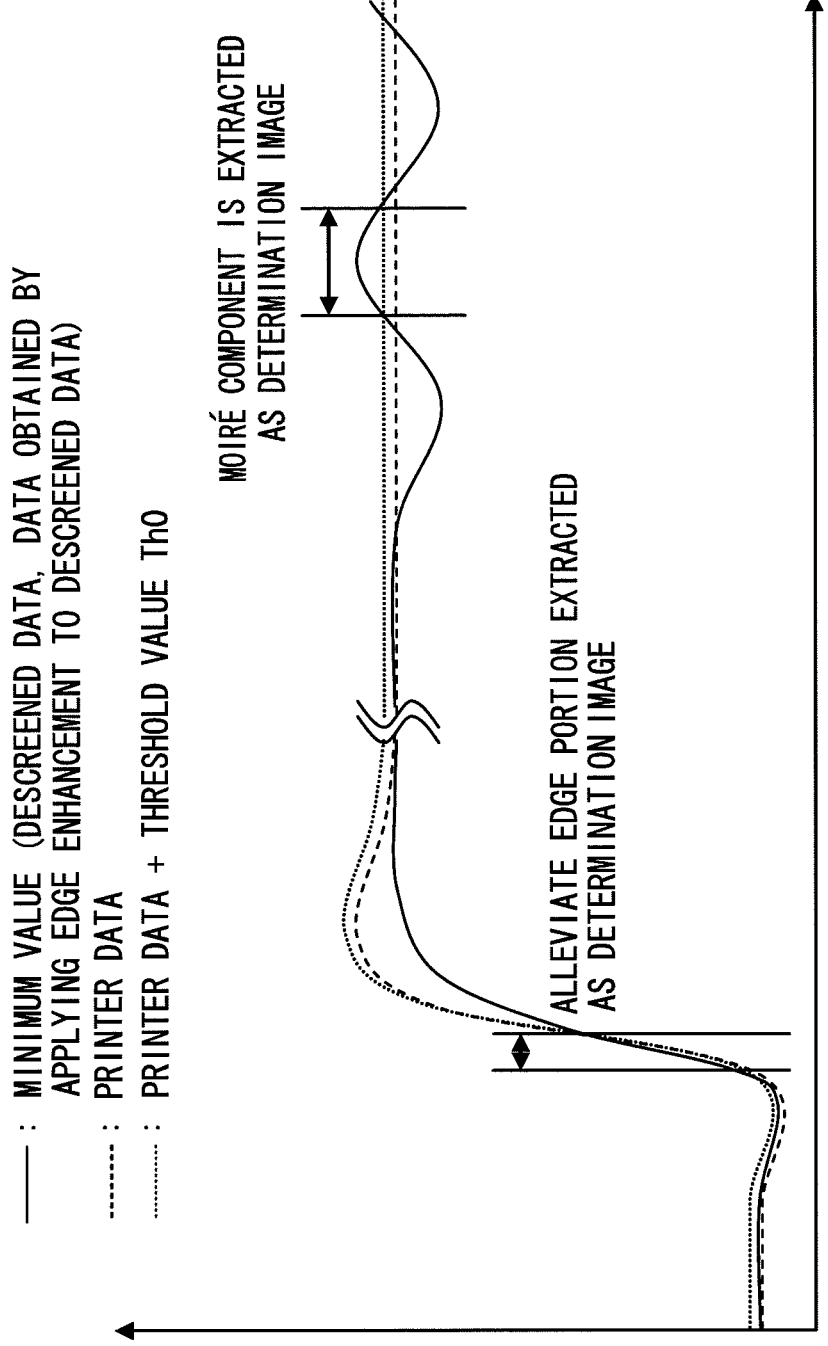
FIG. 12 is a line graph showing an example of change in each set of data in an edge portion of a photo image when a minimum value of descreened data and edge-enhanced descreened data are used in the moiré determination processing pertaining to the third exemplary embodiment.

Here, the value Dn2$i$ of the edge-enhanced descreened data is, as indicated by the bold solid line in FIG. 11 for example, image data that show a change in value in the edge portion within the photo image similar to that of the printer multi-value data and in which the moiré component superimposed on the descreened data is preserved. For that reason, the determination reference value Dm that is the minimum value of the value Dn2$i$ and the value Dn1$i$ becomes, as indicated by the solid line in FIG. 12, data that show a change in value in the background portion side of the edge portion within the photo image similar to that of the printer multi-value data. However, a change in value in the image portion side of the edge portion within the photo image shows transition in lower value than that of the printer multi-value data, and the moiré component is preserved in the image portion side. Consequently, by setting the value Oni to 0 when the reference value Dm is equal to or less than the sum of the reference value Cm and the threshold value Th0, as is apparent by FIG. 12 compared with FIG. 10, the edge component extracted as the determination image is reduced while the moiré component extraction performance is maintained.

Further, in the processing of step 218 to step 234, the determination is made as to whether or not the value Cn2$i$ is equal to or greater than the sum of the value Cn1$i$ and the threshold value Th4 and whether or not the value Cn3$i$ is smaller than the threshold value Th5 (step 226) and, when this determination is also positive, the value Oni is set to 0 (step 228). The determination in step 226 of whether or not the value Cn3$i$ is smaller than the threshold value Th5 is a determination for removing, from the target, a case where the value Cn3$i$ is clearly outside the range of values corresponding to a change in density in the background portion side in the edge portion within a photo image. As the threshold value Th5, a value of about 30 to 40% in terms of the percentage of the density may be set (one example is shown in FIG. 13).

Figure 13:
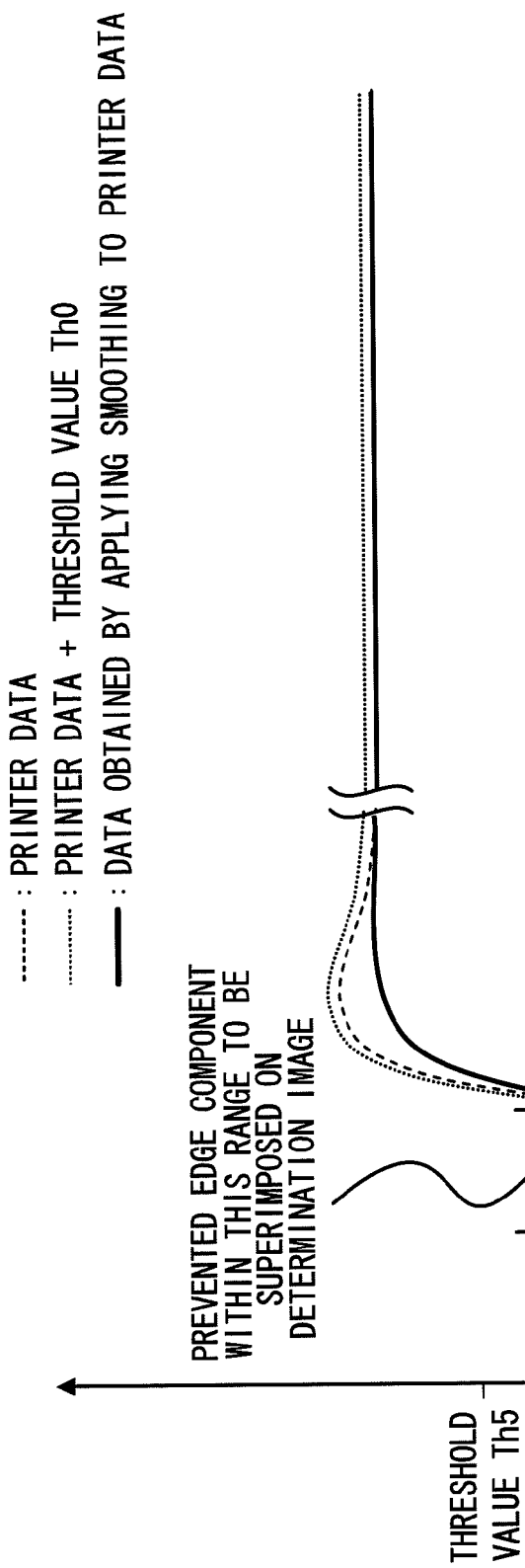
FIG. 13 is a line graph showing an example of change in each set of data in an edge portion of a photo image in a case in which the value of a determination image=0 when smoothed printer data≥descreened data+threshold value Th4 in the moiré determination processing pertaining to the third exemplary embodiment.

On the other hand, as for the value Cn2$i$ of the smoothed printer multi-value data, as indicated by the bold solid line in FIG. 13 for example, the density change in the edge portion within the photo image becomes dull because of smoothing, and in the background portion side of the edge portion within the photo image, the value Cn2$i$ changes at a value equal to or greater than the sum of the value Cn1$i$ and the threshold value Th4. Consequently, the value Oni is set to 0 when the value Cn2$i$ is equal to or greater than the sum of the value Cn1$i$ and the threshold value Th4 and the value Cn3$i$ is smaller than the threshold value Th5. Thus, as shown in FIG. 13, a situation where the edge component corresponding to the density change in the background portion side of the edge portion within the photo image is extracted as the determination image is reduced.

Moreover, in the processing of step 218 to step 234, the determination is made as to whether or not the value Cn1$i$ is equal to or less than the threshold value Th3 (step 218) and, when this determination is positive, the value Oni is also set to 0 (step 228). Thus, even if the original image of the printing target is an image in which images of a photo image and a text document are mixed, for the edge portion of the image of the text document, the edge portion corresponding to the density change in the background portion side of the edge portion is removed from the determination image as a result of the determination of step 218 being positive.

Consequently, a value corresponding to the amplitude of the moiré component is set only to pixels (moiré pixels) corresponding to moiré occurring in the plate making binary data and remaining in the descreened data per each color of C, M, Y, K due to the processing of step 218 to step 234. For pixels other than the moiré pixels, the determination image is obtained in which the value thereof is set to 0 regardless of whether they are pixels corresponding to a photo image or pixels corresponding to a text document, and even if they are pixels corresponding to the edge portion within a photo image.

When the determination image is generated as a result of the processing of step 218 to step 234 for each color of C, M, Y, K of all pixels in the image represented by the descreened data and in the image represented by the printer multi-value data, the determination of step 216 is negative and the processing moves to step 238, where noise removal processing is performed with respect to the generated determination image. For this noise removal processing, known noise removal techniques can be applied, such as a smoothing filter, a Gaussian filter, fast Fourier transform (FFT), contraction by morphology, and isolated point removal. The noise removal processing of step 238 is processing corresponding to the function of the noise remover 130 (see FIG. 8). In the next step 240, determination image generation and output processing is performed, but these are the same processings as in step 182 to step 200 shown in FIGS. 4Am 4B, FIGS. 7A and 7B, and therefore description thereof will be omitted.

In the third exemplary embodiment, the edge enhancement processing is performed with respect to the descreened data in steps 220 to 224 and step 228. As a result, from the descreened data, edge-enhanced descreened data that show a change in value in the edge portion within a photo image similar to that of the printer multi-value data and in which the moiré component superimposed on the descreened data is preserved. The value Oni of the determination image is set to 0 when the reference value Dm that is the minimum value of the value Dn1$i$ and the value Dn2$i$ is equal to or less than the printer multi-value data (specifically, the sum of the threshold value Th0 and the reference value Cm determined from the value Cn1$i$). Thus, a situation is reduced where the edge component corresponding to the density change in the background portion side of the edge portion within a photo image is extracted as the determination image. Alternately, the following processing may be performed instead of this processing.

Figure 14:
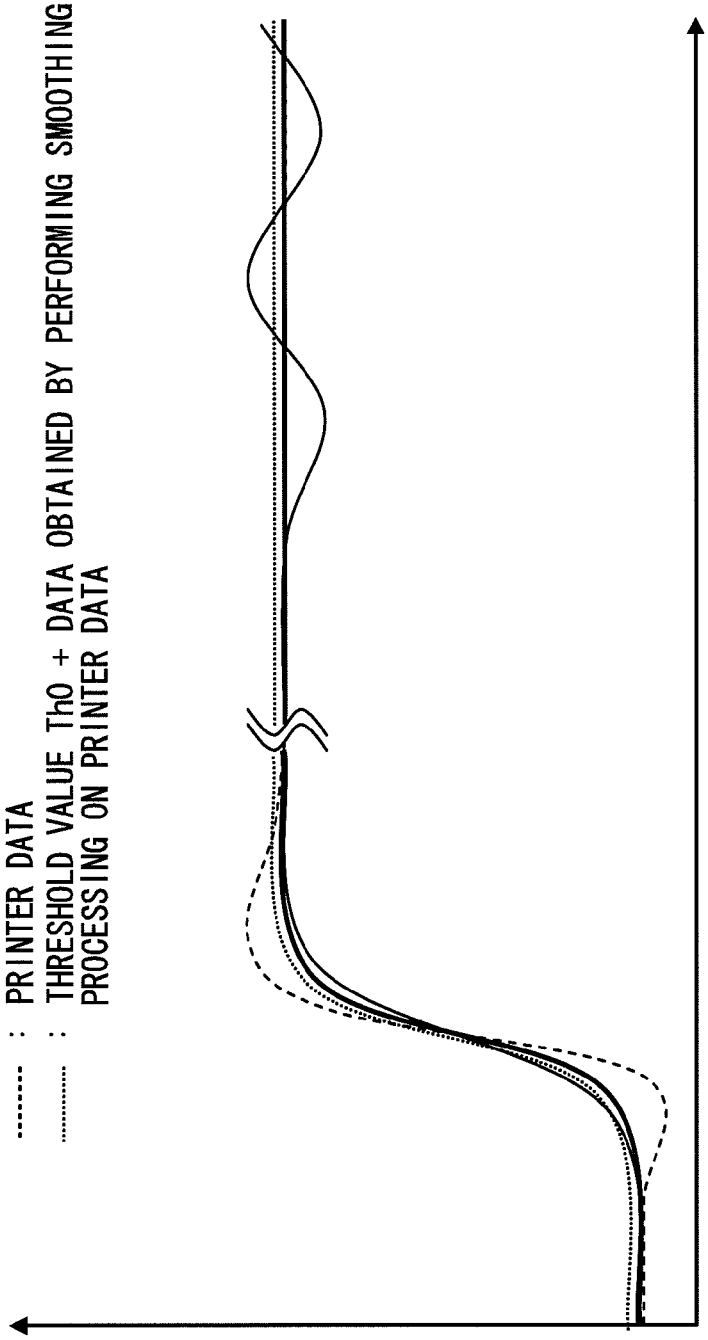
FIG. 14 is a line graph showing an example of change in each set of data in an edge portion of a photo image in another aspect using smoothed printer data.

That is, making the change in the value in the edge portion within a photo image similar between the printer multi-value data and the descreened data can also be realized by performing smoothing processing on the printer multi-value data instead of performing edge enhancement processing with respect to the descreened data as described above. By adjusting the order (the size of the region to be the processing unit) of the filter used in the smoothing processing with respect to the printer multi-value data and the strength of the smoothing, as shown in FIG. 14 for example, the change in the value in the edge portion within the photo image of the smoothed printer data (indicated by the bold solid line in FIG. 14) can be made to approximate the change in the value in the edge portion within the photo image of the descreened data (indicated by the fine solid line in FIG. 14).

Figure 15:
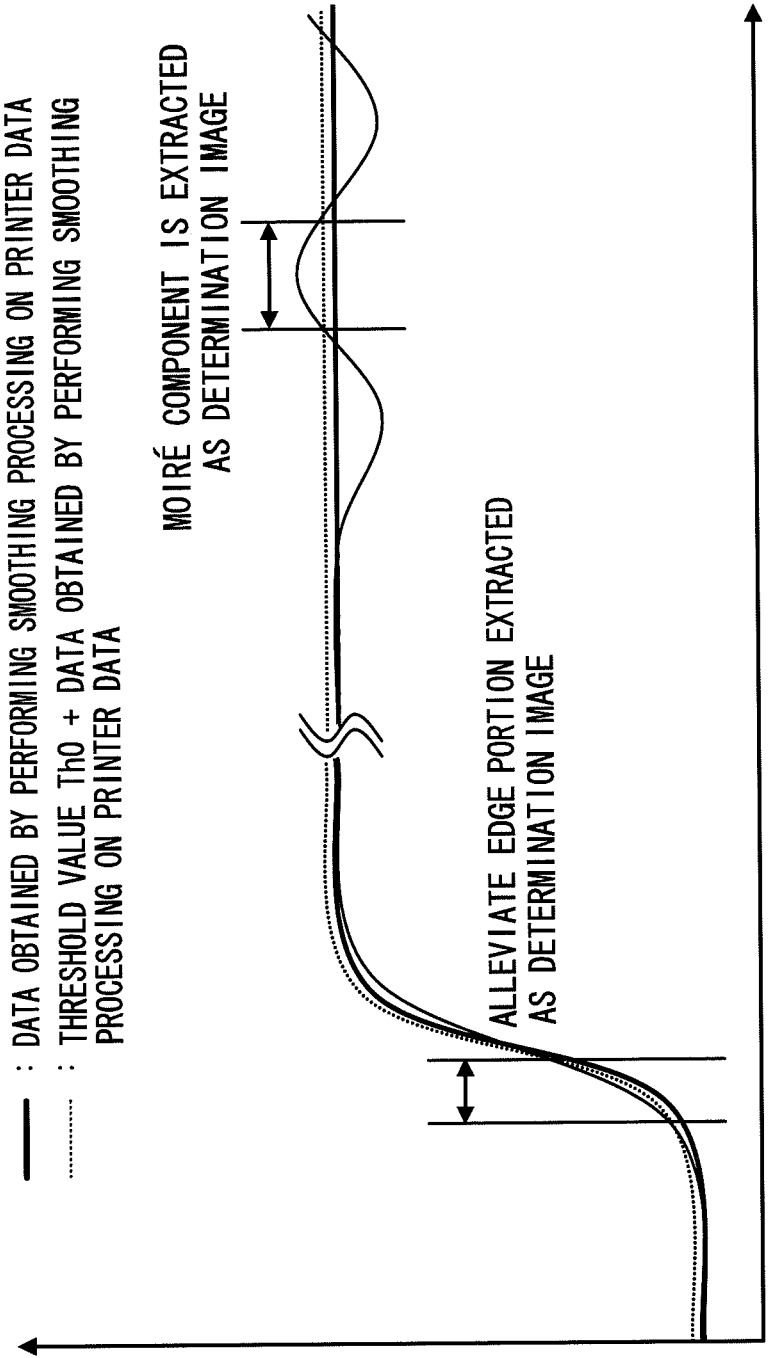
FIG. 15 is a line graph showing an example of change in each set of data in an edge portion of a photo image in the other aspect using smoothed printer data.

Consequently, instead of the processing of steps 220 to 224 and step 228 previously described, a processing may be performed in which the value of the descreened data is compared with the sum of the smoothed printer data and the determination threshold value Th0 and the value Oni is set to 0 when the value of the descreened data is equal to or less than the sum of the smoothed printer data and the threshold value Th0. In this case also, as shown in FIG. 15 for example, a situation where the edge component corresponding to the density change in the background portion side of the edge portion within the photo image is extracted as the determination image is reduced.

However, in this aspect, when the strength of smoothing with respect to the printer data is insufficient or the like, the effect of suppressing a situation where the edge component of the edge portion within the photo image is extracted as the determination image may drop. Further, when the strength of smoothing with respect to the printer data is excessive, for a portion where the density finely changes in the original image, that change is made uniform and the value becomes smaller in the smoothed printer data, whereby the value in the descreened data of that portion becomes larger than that in the smoothed printer data and the pixels corresponding to that portion may be erroneously extracted as moiré pixels. For this reason, in this aspect, the order and strength of the smoothing processing with respect to the printer data may be needed to be finely adjusted such that the dulling of the change in value resulting from the smoothing processing with respect to the printer data being about the same as the dulling of the change in density in the plate making binary data due to the RIP processing.

Fourth Exemplary Embodiment

Figure 16:
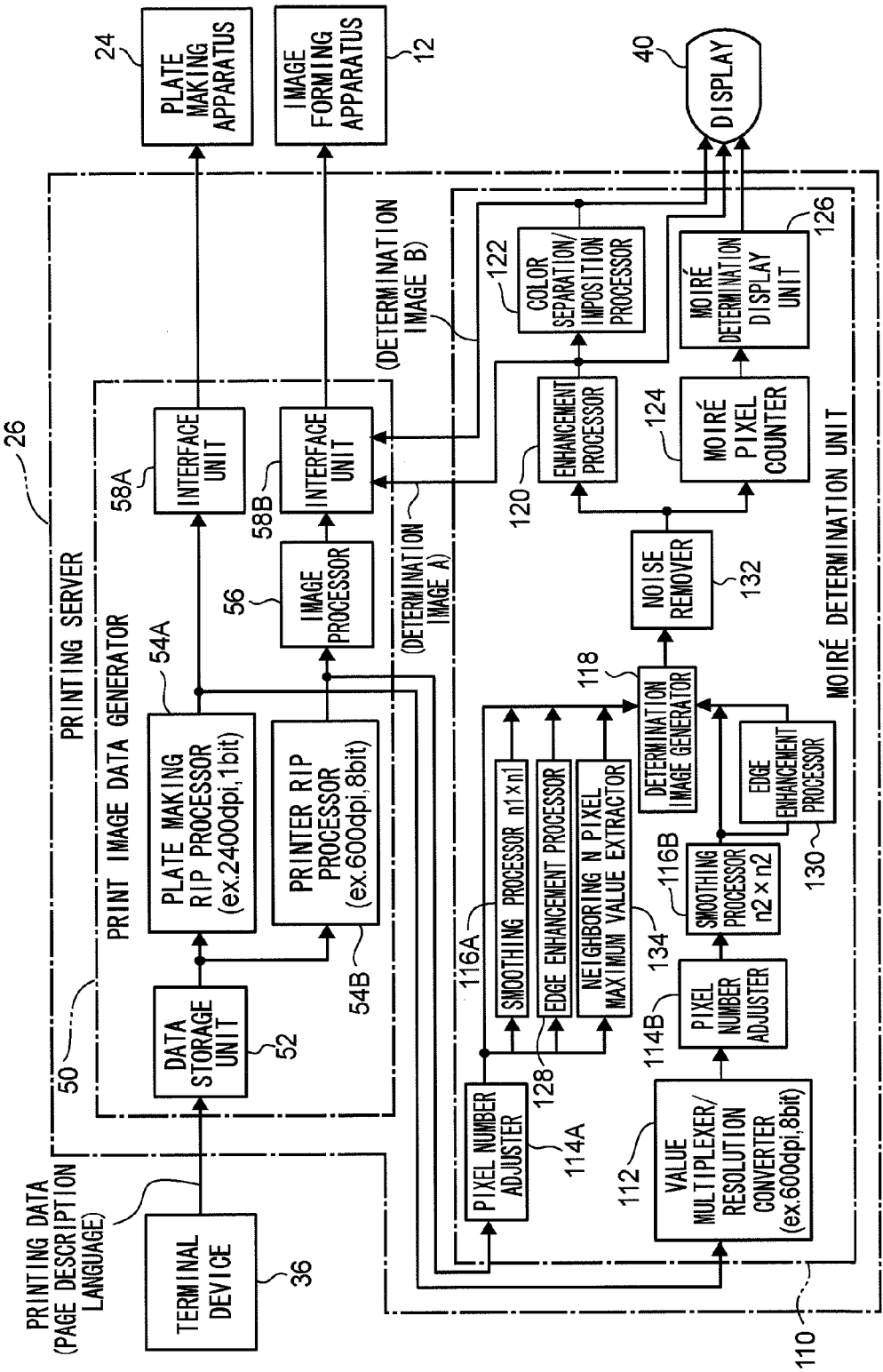
FIG. 16 is a functional block diagram of a printing server pertaining to a fourth exemplary embodiment.

Next, a fourth exemplary embodiment will be described. The same reference numerals will be given to portions that are the same as those in the second exemplary embodiment, and description of those portions will be omitted. As shown in FIG. 16, the moiré determination unit 110 pertaining to the fourth exemplary embodiment differs from the moiré determination unit 110 of the third exemplary embodiment in that a neighboring N pixel maximum value extractor 134 is added. Further, with respect to the determination image generator 118, a maximum value of neighboring N pixels of the printer multi-value data outputted from the neighboring N pixel maximum value extractor 134 is also inputted thereto in addition to the printer multi-value data outputted from the pixel number adjuster 114A, the smoothed printer multi-value data outputted from the smoothing processor 116A, the edge-enhanced printer multi-value data outputted from the edge enhancement processor 128, the descreened data outputted from the smoothing processor 116B, and the edge-enhanced descreened data outputted from the edge enhancement processor 130A.

Figure 17:
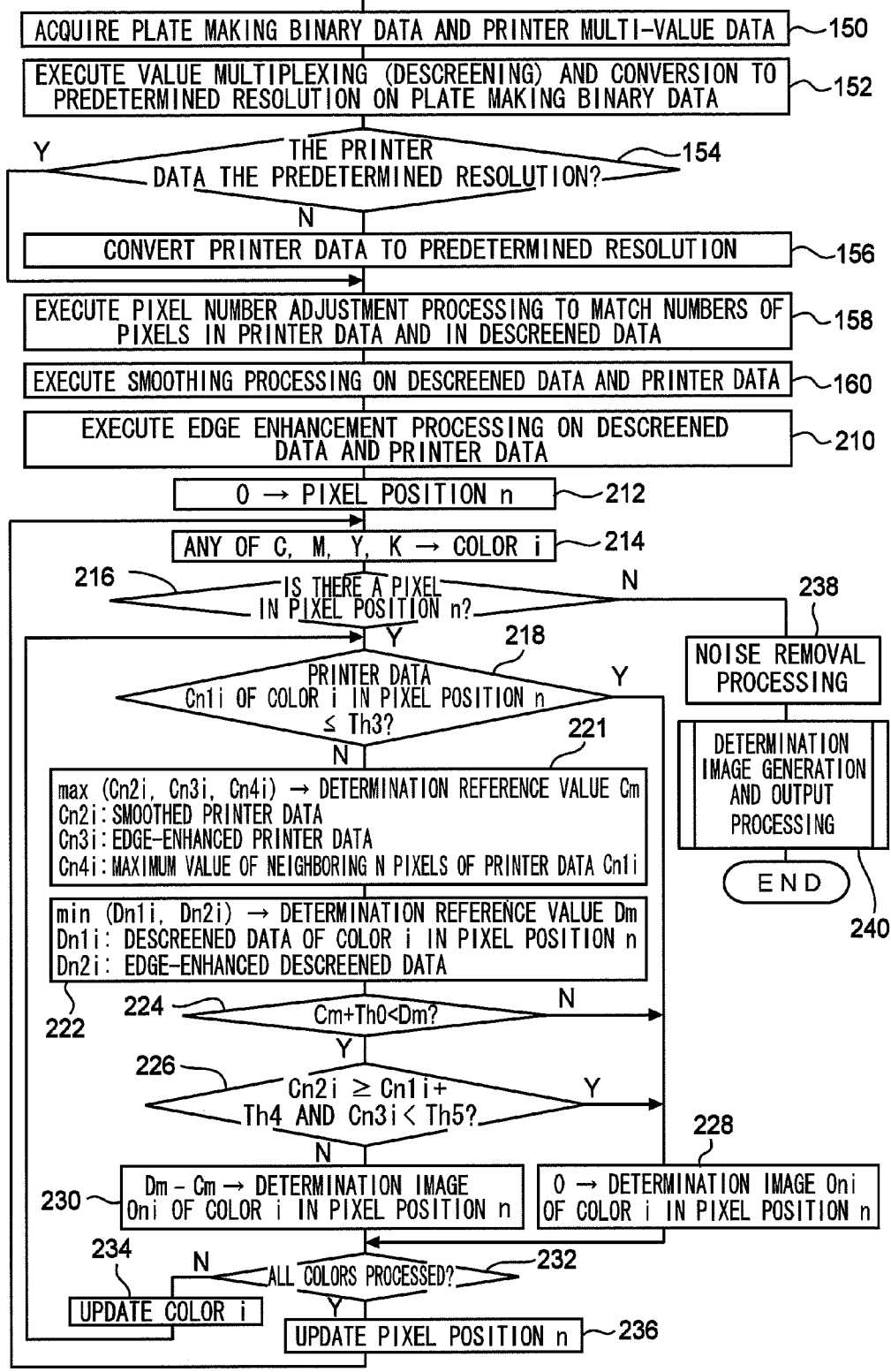
FIG. 17 is a flowchart showing a flow of moiré determination processing pertaining to the fourth exemplary embodiment.
Figure 18:
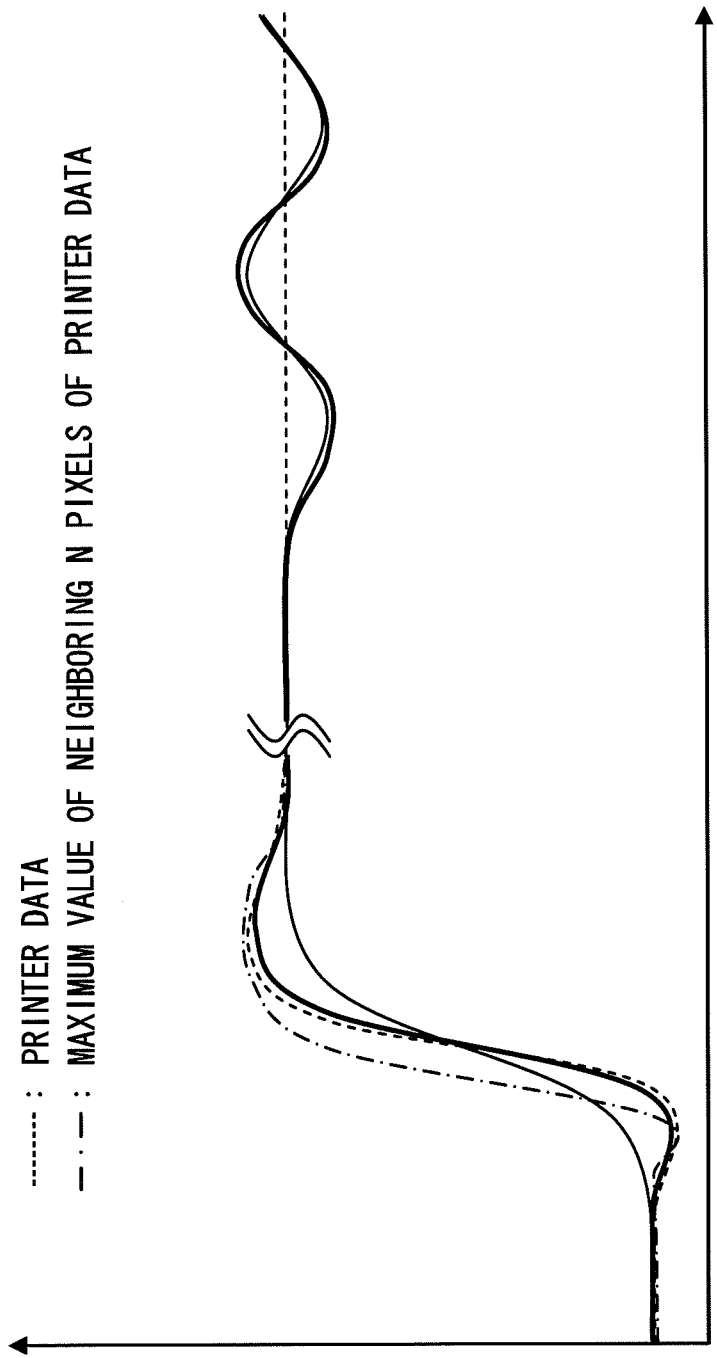
FIG. 18 is a line graph showing an example of change in each set of data in an edge portion of a photo image in the moiré determination processing pertaining to the fourth exemplary embodiment.

The moiré determination processing pertaining to the fourth exemplary embodiment will be described with reference to FIG. 17. In the moiré determination processing described in the third exemplary embodiment (FIG. 9), in step 220, the maximum value of the value $Cn1i$ of the printer multi-value data, the value $Cn2i$ of the smoothed printer multi-value data and the value $Cn3i$ of the edge-enhanced printer multi-value data is set for the determination reference value Cm. The moiré determination processing pertaining to the fourth exemplary embodiment differs from the moiré determination processing of the third exemplary embodiment only in that, instead of the above-described processing, in step 221, the maximum value of the value $Cn2i$ of color i of the pixel in pixel position n of the smoothed printer multi-value data, the value $Cn3i$ of color i of the pixel in pixel position n of the edge-enhanced printer multi-value data and a maximum value $Cn4i$ of color i of N (N≥2) number of pixels existing in the neighborhood of the pixel in pixel position n of the printer multi-value data is set for the determination reference value Cm.

The maximum value $Cn4i$ of color i of the N number of pixels neighboring the pixel in pixel position n of the printer multi-value data corresponds to eighth image data, and the reference value Cm set in step 221 corresponds to seventh image data. Further, in step 221, the processing that extracts the maximum value $Cn4i$ per each of the individual pixels of the value $Cn1i$ is processing corresponding to the function of the neighboring N pixel maximum value extractor 134 (see FIG. 17).

In the moiré determination processing pertaining to the fourth exemplary embodiment, processing from the next step 222 on is the same as in the moiré determination processing described in the third exemplary embodiment. The minimum value of the value $Dn1i$ and the value $Dn2i$ is set for the reference value Dm (step 222), a determination is made as to whether or not the sum of the reference value Cm and the threshold value Th0 is smaller than the reference value Dm (step 224), and the value Oni is set to 0 when this determination is negative (step 228).

The processing of step 221 to step 224 and step 228 will be described further with reference to FIG. 18 to FIG. 22. As mentioned above, in step 221, the maximum value of the value $Cn2i$, the value $Cn3i$ and the maximum value $Cn4i$ is set for the reference value Cm. The maximum value $Cn4i$ is image data obtained by extracting and setting the maximum value of color i of the N number of pixels existing in the neighborhood per each of the individual pixels of the printer multi-value data. Therefore, as indicated by the one-dotted chain line in FIG. 18 for example, in the edge portion within the photo image, the position where the values change moves N pixels toward the background portion side with respect to the values of the printer multi-value data and the value changes in higher values than that of the reference value Dm (the minimum value of the value $Dn1i$ and the value $Dn2i$) across substantially the entire edge portion within the photo image.

Figure 19:
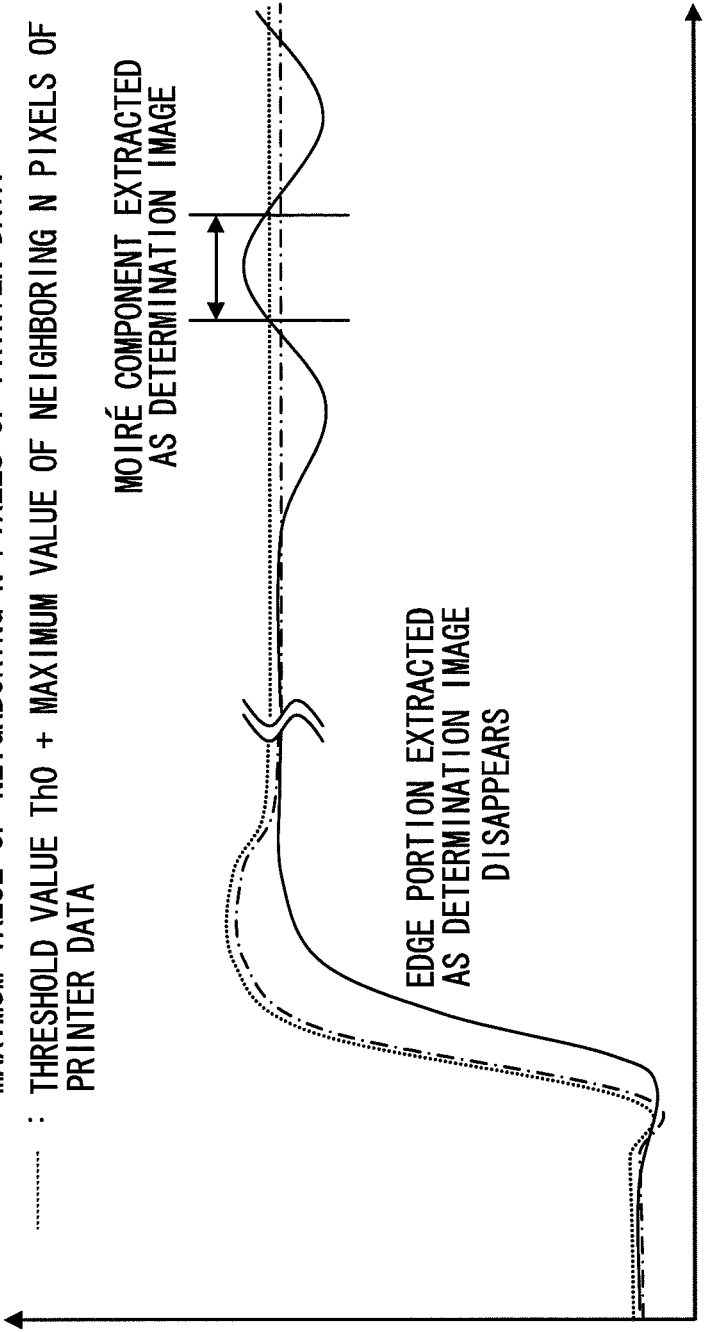
FIG. 19 is a line graph showing an example of change in each set of data in an edge portion of a photo image when a maximum value of neighboring N pixels of printer data is used in the moiré determination processing pertaining to the fourth exemplary embodiment.

The reference value Cm is the maximum value of the value $Cn2i$, the value $Cn3i$ and the maximum value $Cn4i$. Consequently, in the edge portion within the photo image, the maximum value $Cn4i$ of the neighboring N pixels where the position where the values change has moved N pixels toward the background portion side with respect to that of the printer multi-value data becomes the reference value Cm. Consequently, the sum (indicated by the broken line in FIG. 19) of this reference value Cm (=the maximum value $Cn4i$) and the threshold value Th0 is compared with the reference value Dm, and the value Oni is set to 0 when the sum of the reference value Cm and the threshold value Th0 is equal to or greater than the reference value Dm. Thus, as shown in FIG. 19, a situation where the edge component corresponding to the density change of the edge portion within the photo image is extracted as the determination image is prevented or reduced.

Figure 20:
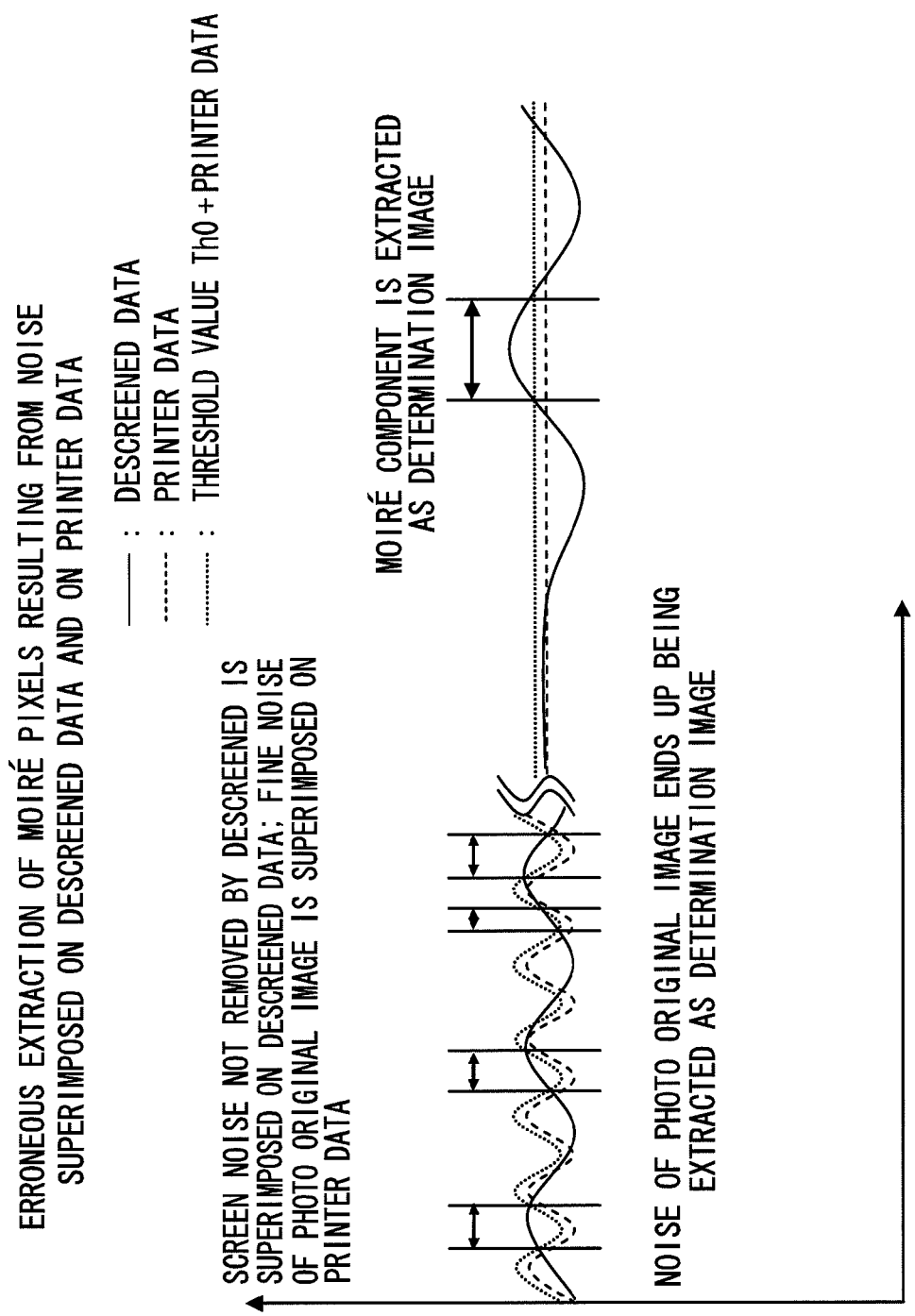
FIG. 20 is a line graph for describing erroneous extraction of moiré pixels resulting from noise superimposed on descreened data and printer data.

There is the potential for screen noise that has not be removed even by the smoothing processing described in the first exemplary embodiment to be superimposed on the descreened data (one example is indicated by the solid line in FIG. 20). Also on the printer image data, if the original image is a photo image, noise (noise whose cycle is shorter than that of screen noise; one example is indicated by the bold broken line in FIG. 20) caused by an imaging element such as a CCD of a digital camera may be superimposed in high potential.

When screen noise had been superimposed on the descreened data and noise had been superimposed also on the printer data, for example, even if the moiré determination processing described in the first to third exemplary embodiments have been applied, for example, as shown in FIG. 20, in a portion in the image where the density is substantially uniform, a portion where the value $Dn1i$ (or the reference value Dm) becomes higher than the sum of the value $Cn1i$ (or the reference value Cm) and the threshold value Th0 arises because of fluctuation in the value of each set of data caused by the noise superimposed thereon, and the pixels of this portion can be erroneously extracted as moiré pixels.

Figure 21:
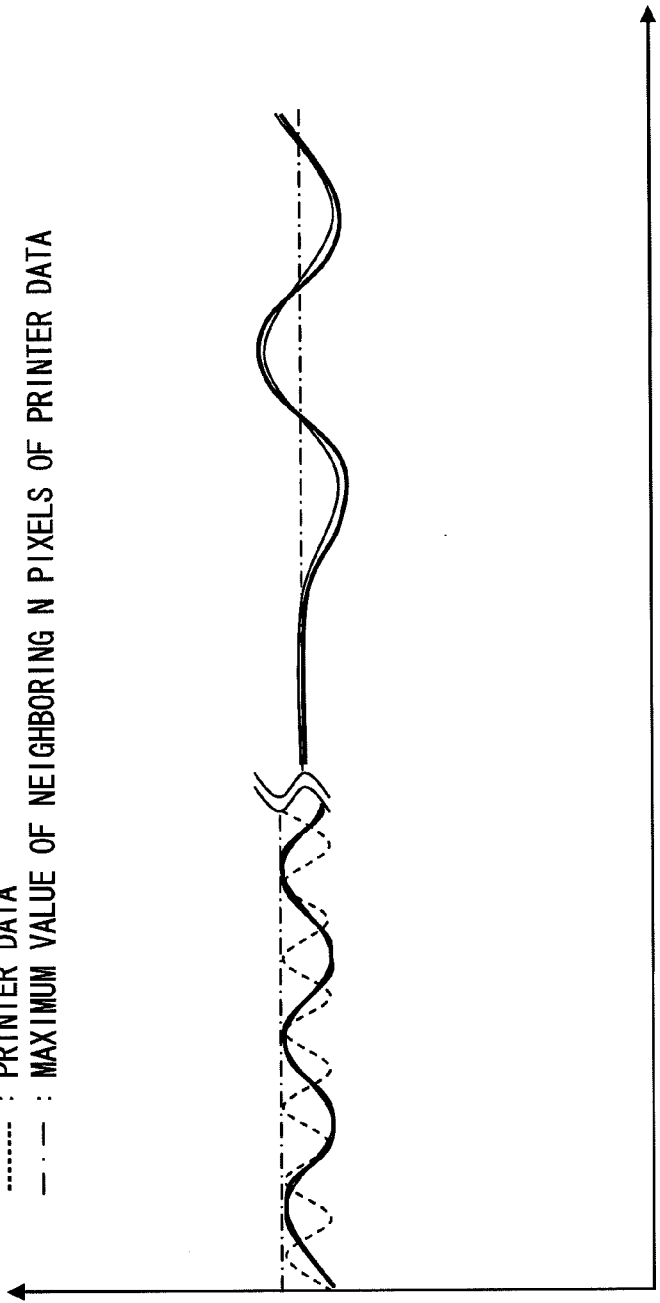
FIG. 21 is a line graph diagram showing an example of change in each set of data in a portion whose density is substantially uniform in the moiré determination processing pertaining to the fourth exemplary embodiment.
Figure 22:
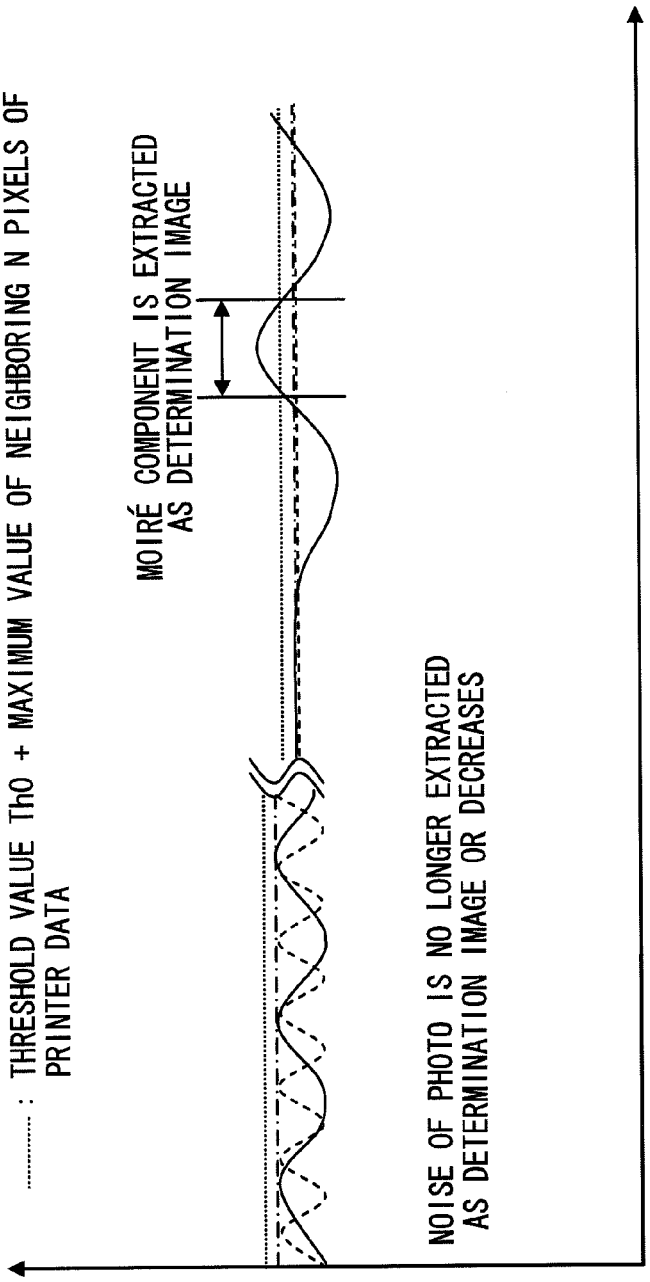
FIG. 22 is a line graph showing an example of change in each set of data in a portion whose density is substantially uniform, when a maximum value of neighboring N pixels of printer data is used in the moiré determination processing pertaining to the fourth exemplary embodiment.

With respect thereto, in the moiré determination processing pertaining to the fourth exemplary embodiment, if the distribution length on the image of the N number of pixels used in the calculation of the maximum value $Cn4i$ is equal to or greater than the length on the image of the cycle of noise superimposed on the printer data, in a portion in the image where the density is substantially uniform, as indicated by the one-dotted chain line in FIG. 21, the maximum value $Cn4i$ will be a constant value corresponding to the maximum value of the printer multi-value data in that portion. For this reason, in a portion in the image where the density is substantially uniform, the maximum value $Cn4i$ is the reference value Cm. Thus, as shown in FIG. 22, the portion where the reference value Dm (indicated by the solid line in FIG. 22) is higher than the sum (indicated by the fine broken line in FIG. 22) of the reference value Cm and the threshold value Th0 disappears, whereby a situation where the moiré pixels are erroneously extracted because of the affect of noise superimposed on the descreened data and the printer data is prevented or reduced.

When the distribution length on the image of the N number of pixels is shorter than the length on the image of the cycle of the noise superimposed on the printer data, although fluctuations in value arise, the maximum value $Cn4i$ will be the maximum value of the printer multi-value data or a value close to that maximum value. For that reason, the portion where the reference value Dm is higher than the sum of the reference value Cm and the threshold value Th0 is reduced, and the moiré pixels erroneously extracted due to the affect of noise superimposed on the descreened data and the printer data are reduced.

Fifth Exemplary Embodiment

Figure 23:
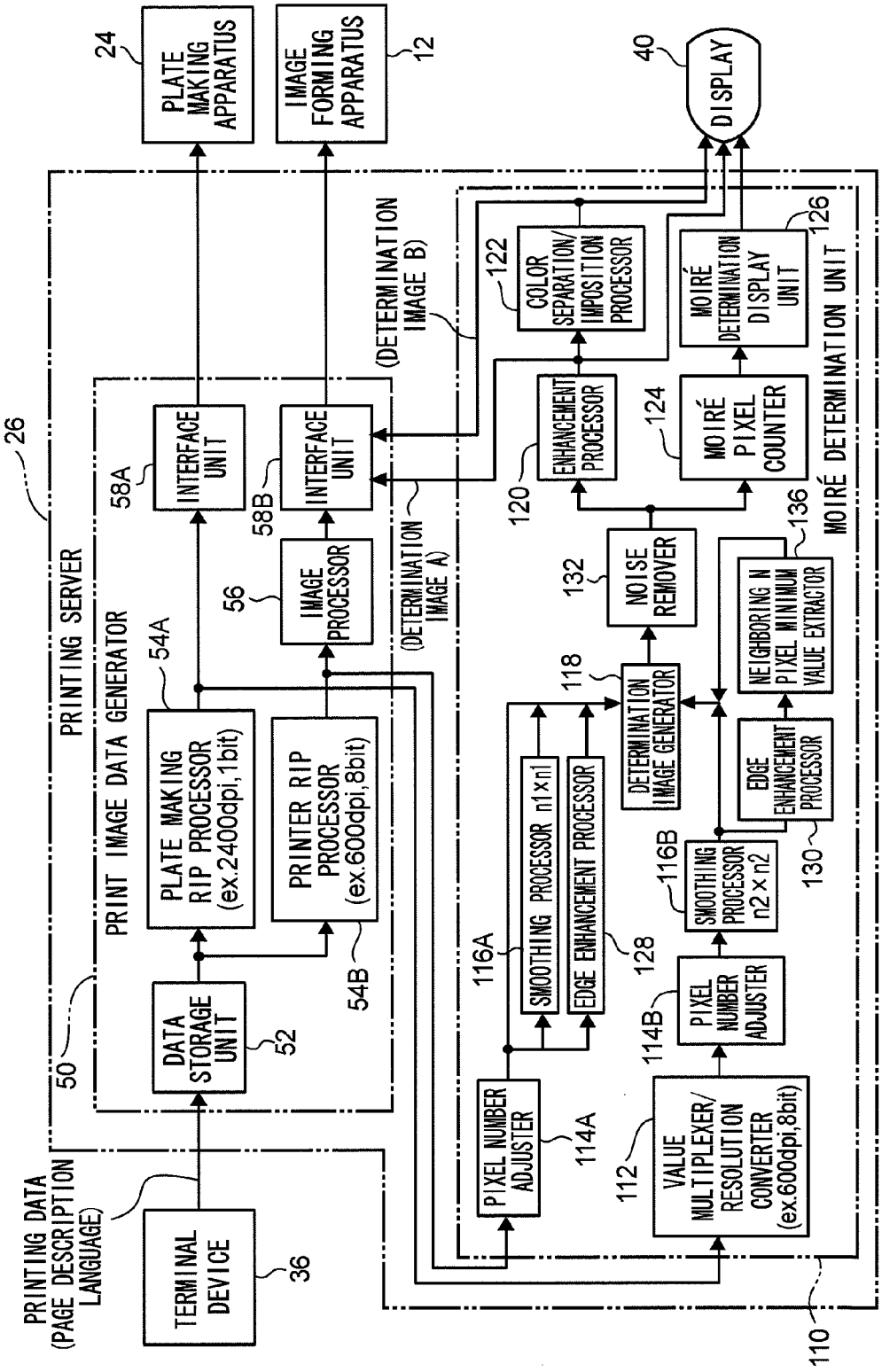
FIG. 23 is a functional block diagram of a printing server pertaining to a fifth exemplary embodiment.

Next, a fifth exemplary embodiment will be described. The same reference numerals will be given to portions that are the same as those in the third exemplary embodiment, and description of those same portions will be omitted. As shown in FIG. 23, the moiré determination unit 110 pertaining to the fifth exemplary embodiment differs from the moiré determination unit 110 of the third exemplary embodiment in that a neighboring N pixel minimum value extractor 136 to which the edge-enhanced descreened data outputted from the edge enhancement processor 130A are inputted is added. Further, with respect to the determination image generator 118, a minimum value of neighboring N pixels of the edge-enhanced descreened data outputted from the neighboring N pixel minimum value extractor 136 is also inputted thereto in addition to the printer multi-value data outputted from the pixel number adjuster 114A, the smoothed printer multi-value data outputted from the smoothing processor 116A, the edge-enhanced printer multi-value data outputted from the edge enhancement processor 128, and the descreened data outputted from the smoothing processor 116B.

Figure 24:
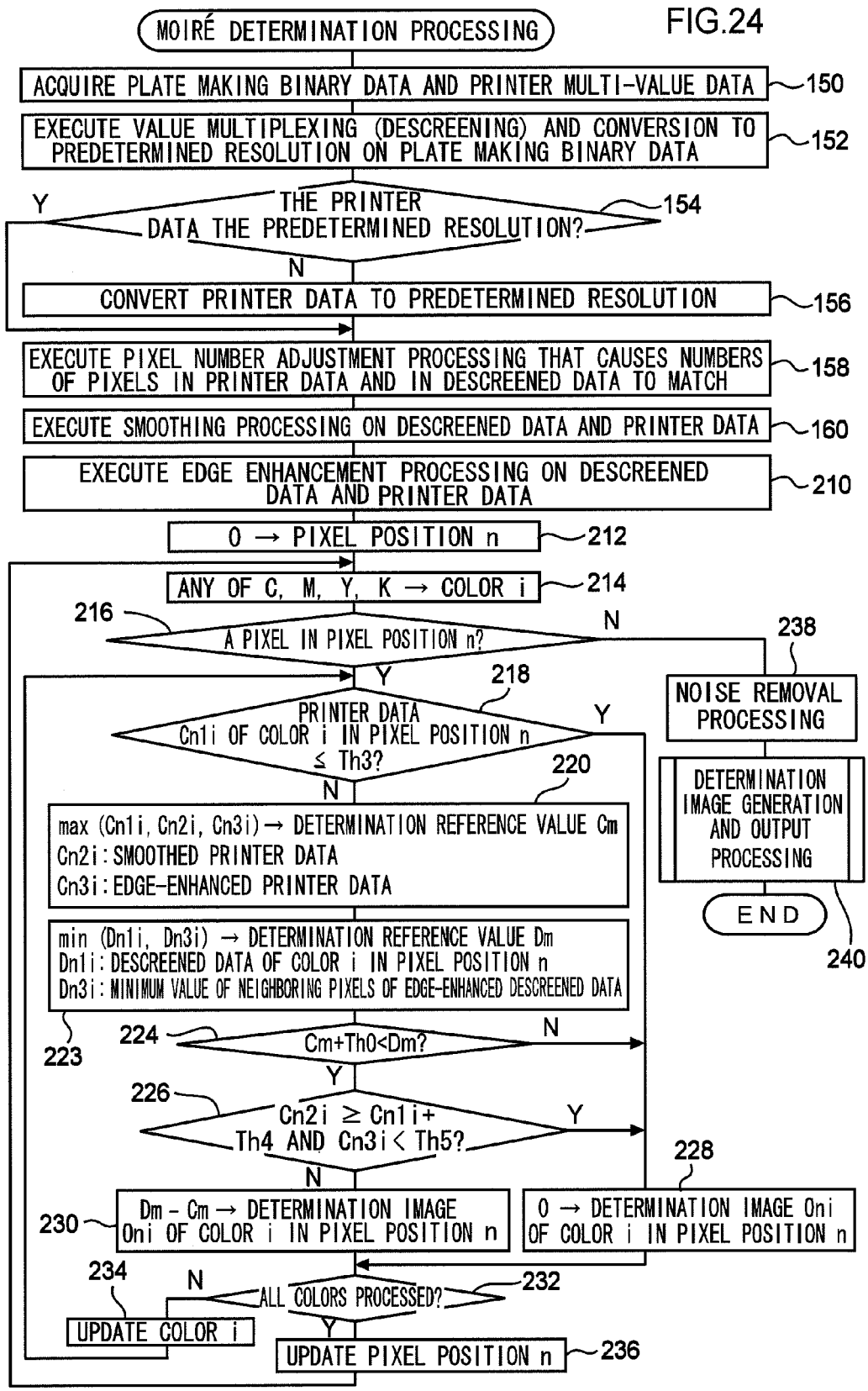
FIG. 24 is a flowchart showing a flow of moiré determination processing pertaining to the fifth exemplary embodiment.
Figure 25:
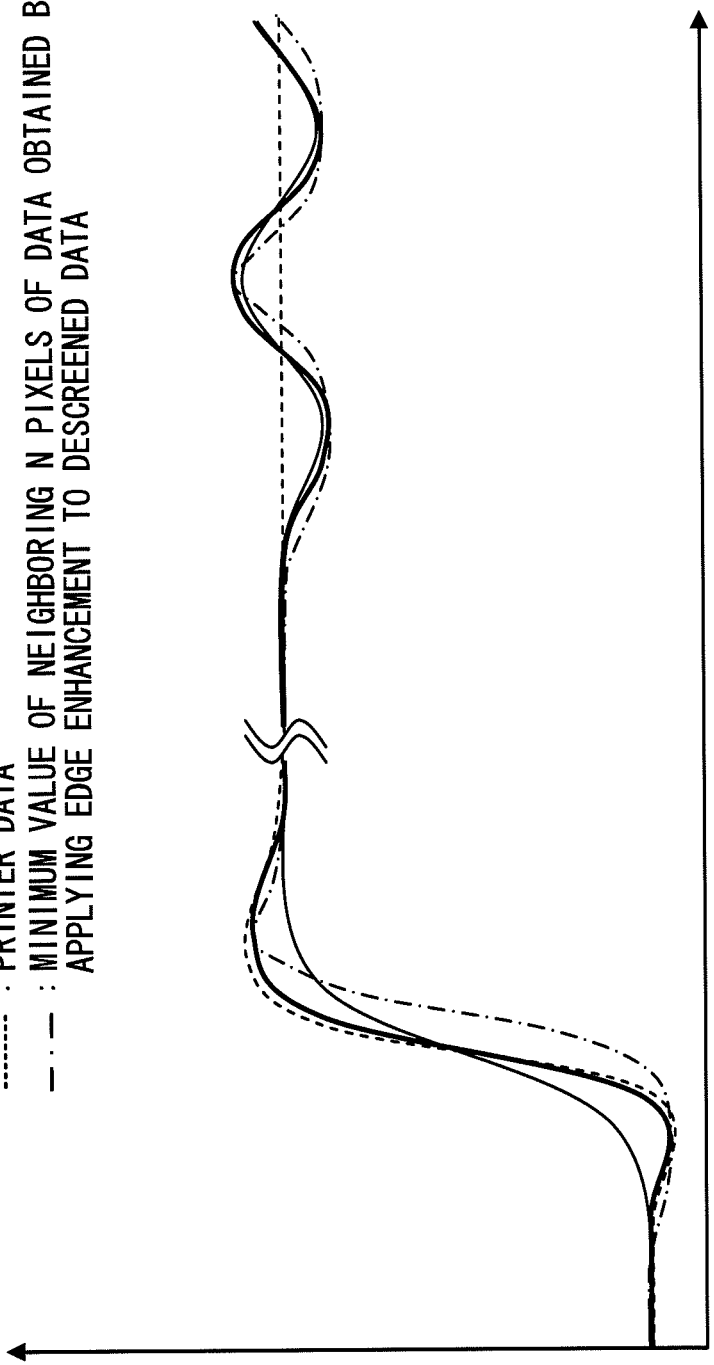
FIG. 25 is a line graph showing an example of change in each set of data in an edge portion of a photo image in the moiré determination processing pertaining to the fifth exemplary embodiment.

The moiré determination processing pertaining to the fifth exemplary embodiment will be described with reference to FIG. 24. In the moiré determination processing of the third exemplary embodiment (FIG. 9), in step 220, the maximum value of the value $Cn1i$, the value $Cn2i$ and the value $Cn3i$ is set for the determination reference value Cm and thereafter in step 222, the minimum value of the value $Dn1i$ and the value $Dn2i$ is set for the determination reference value Dm. The moiré determination processing pertaining to the fifth exemplary embodiment differs from the moiré determination processing described in the third exemplary embodiment only in that, instead of the processing of step 222, in step 223, the minimum value of the value $Dn1i$ of the descreened data and a minimum value $Dn3i$ of color i of N (N≥2) number of pixels existing in the neighborhood of the pixel in pixel position n of the edge-enhanced descreened data is set for the determination reference value Dm.

The minimum value $Dn3i$ of color i of the N number of pixels neighboring the pixel in pixel position n of the edge-enhanced descreened data corresponds to ninth image data, and the determination reference value Dm set in step 223 corresponds to tenth image data. Further, in step 223, the processing that extracts the minimum value $Dn3i$ is processing corresponding to the function of the neighboring N pixel minimum value extractor 136 (see FIG. 23).

In the moiré determination pertaining to the fifth exemplary embodiment, processing from the next step 224 on is the same as that in the moiré determination processing described in the third exemplary embodiment. The determination is made as to whether or not the sum of the reference value Cm and the threshold value Th0 is smaller than the reference value Dm (step 224), and the value Oni is set to 0 when this determination is negative (step 228).

The processing of steps 220, 223, 224 and 228 will be described further with reference to FIG. 25 to FIG. 28. As mentioned above, in step 223, the minimum value of the value $Dn1i$ and the minimum value $Dn3i$ is set for the reference value Dm. The minimum value $Dn3i$ is image data obtained by extracting and setting the minimum value of color i of the N number of pixels existing in the neighborhood per each of the individual pixels of the edge-enhanced descreened data. Therefore, as indicated by the one-dotted chain line in FIG. 25 for example, in the edge portion within the photo image, the position where the values change moves N pixels toward the image portion side with respect to that of the edge-enhanced descreened data, and the values changes in lower values than that of the reference value Cm (the maximum value of the value $Cn1i$, the value $Cn2i$ and the value $Cn3i$) across substantially the entire edge portion within the photo image.

Figure 26:
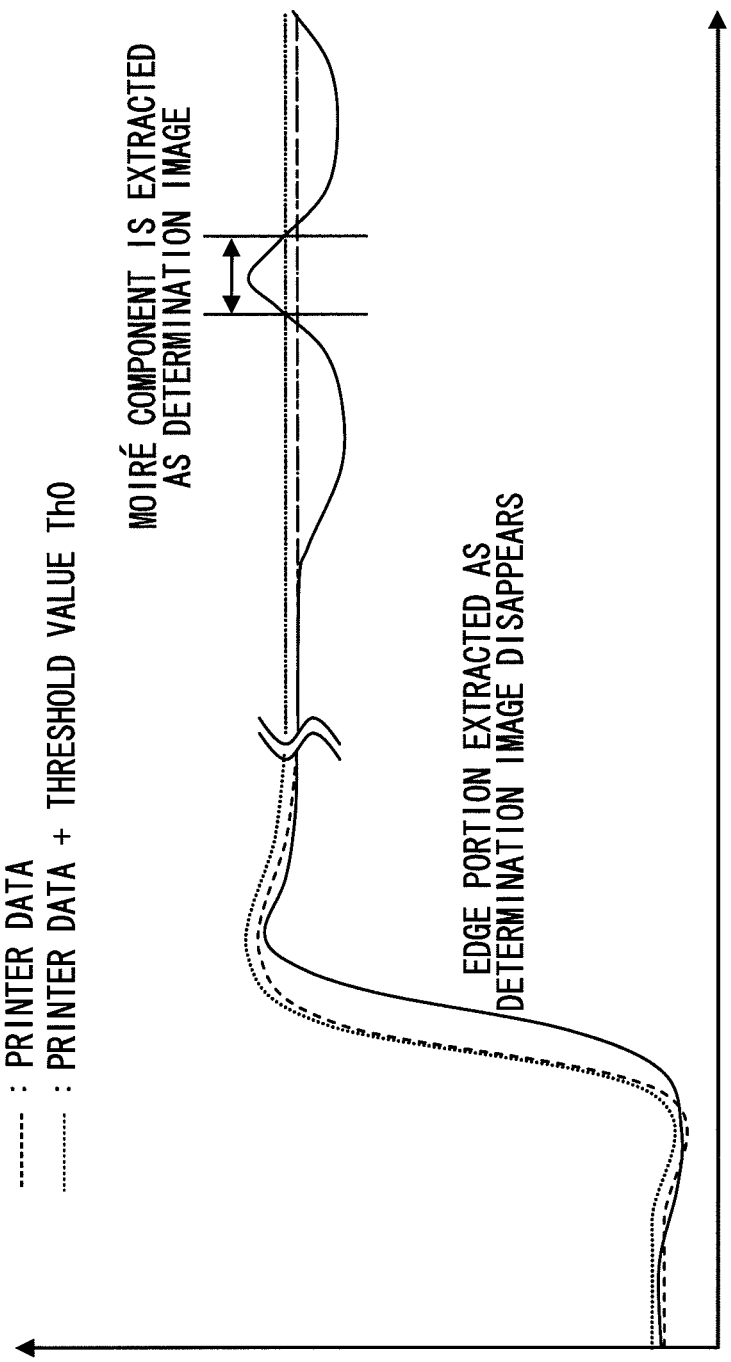
FIG. 26 is a line graph showing one example of change in each set of data in an edge portion of a photo image when a minimum value of neighboring N pixels of enhancement-processed descreened data is used in the moiré determination processing pertaining to the fifth exemplary embodiment.

The reference value Dm is the minimum value of the value $Dn1i$ and the minimum value $Dn3i$. Therefore, in the edge portion within the photo image, the minimum value $Dn3i$ of the neighboring N pixels where the position where the values change has moved N pixels toward the image portion side with respect to that of the edge-enhanced descreened data becomes the reference value Dm. Consequently, this reference value Dm (=the minimum value $Dn3i$ indicated by the solid line in FIG. 26) is compared with the sum (indicated by the broken line in FIG. 26) of the reference value Cm and the threshold value Th0, and the value Oni is set to 0 when the reference value Dm is equal to or less than the sum of the reference value Cm and the threshold value Th0. Thus, as shown in FIG. 26, a situation where the edge component corresponding to the density change of the edge portion within the photo image is extracted as the determination image is prevented or reduced.

Further, when screen noise had been superimposed on the descreened data and noise had been superimposed also on the printer data, in the moiré determination processing of the fifth exemplary embodiment, in a portion in the image where the density is substantially uniform, the minimum value $Dn3i$ (indicated by the one-dotted chain line in FIG. 27) exhibits a change where the period in which it exhibits a relatively high value with respect to the change in the value $Dn1i$ (indicated by the solid line in FIG. 27) becomes shorter and the period in which it exhibits a relatively low value becomes longer. The minimum value $Dn3i$ in a portion in the image where the density is substantially uniform is not constant as the maximum value $Cn4i$ of the neighboring N pixels of the printer multi-value data in the fourth exemplary embodiment. This is because it is necessary to make the value of N larger in order to make the minimum value $Dn3i$ constant since the cycle of the screen noise superimposed on the descreened data is longer than that of the noise superimposed on the printer data, and when the value of N is made too large, this has an adverse impact on the moiré pixel extraction performance.

Due to the minimum value $Dn3i$ changes in a portion in the image where the density is substantially uniform as described above, the minimum value $Dn3i$ becomes the reference value Dm in the portion in the image where the density is substantially uniform. As shown in FIG. 28, due to the portion where the reference value Dm (indicated by the solid line in FIG. 28) is higher than the sum (indicated by the fine broken line in FIG. 22) of the reference value Cm and the threshold value Th0 decreases, a situation where the moiré pixels are erroneously extracted due to the affect of noise superimposed on the descreened data and the printer data is reduced.

In the above description, an aspect has been described in which the number of pixels (moiré pixels) where at least one value of each color of C, M, Y, K of each pixel in the determination image is equal to or greater than the determination threshold value Th1 is counted(step 182), a determination is made as to whether or not there is moiré on the basis of whether or not the result of counting the moiré pixels (the number of moiré pixels) is equal to or greater than the determination threshold value Th2, and the determination result is displayed on the display 40 of the terminal device 36 (step 184). However, exemplary embodiments are not limited to this and may also be configured such that the result of counting the moiré pixels or the percentage of moiré pixels occupying the total number of pixels are presented to the user, and the user may determine whether or not there is moiré.

In the moiré determination processing described in the first exemplary embodiment (FIGS. 4A and 4B), the difference between the value Dn1$i$ and both the value Cn1$i$ and the determination threshold value Th0 is set as the value Oni of the determination image (step 174) when the value Cn1$i$ of the printer multi-value data is not 0 (when the determination of step 168 is negative) and the sum of the value Cn1$i$ and the determination threshold value Th0 is smaller than the value Dn1$i$ of the descreened data (when the determination of step 170 is positive). However, exemplary embodiments are not limited to this and may also be configured such that the determination threshold value Th0 is not used and the difference between the value Dn1$i$ and the value Cn1$i$ may be set as the value Oni of the determination image when the value Cn1$i$ is not 0 and the value Cn1$i$ is smaller than the value Dn1$i$ of the descreened data. In regard to the moiré determination processing described in the second exemplary embodiment (FIGS. 7A and 7B), the difference between the value Dn1$i$ and both the value Cn2$i$ of the smoothed printer multi-value data and the determination threshold value Th0 is set as the value Oni of the determination image (step 175) when the value Cn1$i$ of the printer multi-value data is not 0 (when the determination of step 168 is negative) and the sum of the determination reference value Cm and the determination threshold value Th0 is smaller than the value Dni of the descreened data (when the determination of step 171 is positive). However, exemplary embodiments are not limited to this and may also be configured such that the determination threshold value Th0 is not used and difference between the value Dn1$i$ and the value Cn2$i$ may be set as the value Oni of the determination image when the value Cn1$i$ is not 0 and the determination reference value Cm is smaller than the value Dn1$i$ of the descreened data. The same modification may be applied to the third to fifth exemplary embodiments. Although it becomes easier than in the aspect where the determination threshold value Th0 is used to be affected by noise remaining in the printer multi-value data and the descreened data when the determination threshold value Th0 is not used as described above, such an aspect is also included in the scope of disclosure.

In the first and second exemplary embodiments, aspects are described in which the second value is set to "0", and in the first to fifth exemplary embodiments, aspects are described in which the third value is set to "0". However, exemplary embodiments are not limited to this, and the second value may also be a value that is larger than 0 but close to 0. Further, it suffices for the third value to be a value with which moiré pixels whose values corresponding to the moiré component are to be set can be clearly distinguished in an image from non-moiré pixels that are to be set the third value. For example, a tag representing whether or not a pixel is a non-moiré pixel may be provided per each pixel and per each color, the value of a non-moiré pixel may be tentatively set to 0, information indicating that a pixel is a non-moiré pixel may be set in the tag, and at the time of output of the determination image of any color of the colors of C, M, Y, K, the value (third value) of the non-moiré pixels may be reset such that the non-moiré pixels are outputted in a different color than that of the moiré pixels.

Moreover, in the moiré determination processing (FIG. 9) pertaining to the third exemplary embodiment and the moiré determination processing (FIG. 24) pertaining to the fifth exemplary embodiment, in step 224, the determination reference value Dm is compared with the sum of the determination reference value Cm and the determination threshold value Th0. However, the exemplary embodiments are not limited to this. The processing may also be configured to use the printer multi-value data (second image data) instead of the determination reference value Cm and compare the determination reference value Dm with the sum of the value Cn1$i$ of the printer multi-value data and the determination threshold value Th0. Although the precision of the removal of the edge component from the determination image drops when the value Cn1$i$ of the printer multi-value data is used instead of the determination reference value Cm, such an aspect can also be included in the scope of disclosure.

Further, in the moiré determination processing pertaining to the fourth exemplary embodiment (FIG. 17), in step 224, the determination reference value Dm is compared with the sum of the determination reference value Cm and the determination threshold value Th0. However, exemplary embodiments are not limited to this. The processing may also be configured to use the descreened data (first image data) instead of the determination reference value Dm, and compare the value Dn1$i$ of the descreened data with the sum of the determination reference value Cm and the determination threshold value Th0. Although the precision of the removal of the edge component from the determination image drops when the value Dn1$i$ of the descreened data is used instead of the determination reference value Dm, such an aspect can also be included in the scope of rights of the present application.

Further, in the moiré determination processing pertaining to the third exemplary embodiment (FIG. 9), the moiré determination processing pertaining to the fourth exemplary embodiment (FIG. 17) and the moiré determination processing pertaining to the fifth exemplary embodiment (FIG. 24), in step 218, a determination is made as to whether or not the value Cn1$i$ of the printer multi-value data was equal to or less than the determination threshold value Th3 and, when the determination is positive, the value Oni of the determination image is set to 0 in step 228. However, exemplary embodiments are not limited to this. For example, it is also possible to omit the above-described determination when, for example, an image portion corresponding to a text document is not included in the original image.

Moreover, in the moiré determination processing pertaining to the third exemplary embodiment (FIG. 9), the moiré determination processing pertaining to the fourth exemplary embodiment (FIG. 17) and the moiré determination processing pertaining to the fifth exemplary embodiment (FIG. 24), in step 226, a determination is made as to whether or not the value Cn2$i$ of the smoothed printer multi-value data is equal to or greater than the sum of the value Cn1$i$ of the printer multi-value data and the determination threshold value Th4 and whether or not the value Cn3$i$ of the edge-enhanced printer multi-value data is smaller than the determination threshold value Th5 and, when the determination is positive, the value Oni of the determination image is set to 0 in step 228. This processing may also be added to the moiré determination processing pertaining to the first exemplary embodiment (FIGS. 4A and 4B) and the moiré determination processing pertaining to the second exemplary embodiment (FIGS. 7A and 7B).

In the above description, embodiments are described in which the original image is outputted (display on a display device, printing on recording paper, etc.) together with the determination image. However, exemplary embodiments are not limited to this. In the above-described exemplary embodiments, the edge component is removed from the determination image. Therefore, although a moiré component had been clearly manifest on the determination image, it may be difficult for a user to judge, just by referencing the determination image, whether the region on the determination image in which the moiré component is clearly manifest corresponds to what region in the original image. Outputting the original image together with the determination image has the purpose of aiding this judgment. However, the edge component may also be extracted from the original image (e.g., the printer multi-value data that have undergone pixel number adjustment processing) and the extracted edge component may be added to the determination image. Further, when displaying the determination image on a display device, enhancement of the edge component to be added to the determination image may be changed in real time in response to an instruction from the user. Thus, it becomes possible to judge, just by referencing the determination image, whether what region the region on the determination image in which the moiré component is clearly manifest corresponds to in the original image, and it is possible to omit the outputting of the original image together with the determination image. The aspect described above is also included in the scope of disclosure.

In the above description, embodiments are described in which the resolution of the data of the determination image matches the resolution of the print image data usable in printing by the image formation apparatus 12, whereby it is unnecessary to convert the resolution of the data of the determination image at the time of printing of the determination image by the image formation apparatus 12. However, exemplary embodiments are not limited to this, and the resolution of the data of the determination image may not be matched with the resolution of the print image data usable in printing by the image formation apparatus 12. For example, when the resolution of the print image data usable in printing by the image formation apparatus 12 is 600 dpi, the resolution of the data of the determination image may be made 1200 dpi, and when the determination image is to be printed by the image formation apparatus 12, the resolution of the data of the determination image may be converted from 1200 dpi to 600 dpi.

In the above description, embodiments are described in which, after the determination image has been generated, the generated determination image is displayed on the display of the terminal device 36 and the determination image is printed on recording paper by the image formation apparatus 12 when the printing is instructed to the terminal device 36. However, exemplary embodiments are not limited to this and may also be configured to perform printing of the determination image on a recording paper each time the moiré determination is instructed or may also be configured such that one of display of the determination image on a display device or printing of the determination image on a recording paper is omitted.

The printing apparatus that prints the determination image is not limited to a configuration where printing of an image is performed by an electrophotographic system like the image formation apparatus 12 and may also have a configuration where printing of an image is performed by other publicly known system such as an inkjet system.

In the above description, embodiments are described in which the printing server 26 is configured to function as the image processing apparatus. However, exemplary embodiments are not limited to this. The image formation apparatus 12 may be configured to function as the image processing apparatus, or the terminal device 36 may be configured to function as the image processing apparatus pertaining.

In the above description, embodiments are described in which the moiré determination program corresponding to the image processing program is stored (installed) beforehand in the storage unit 28C of the printing server 26. However, the image processing program may be provided in a form of being recorded in a recording medium such as a CD-ROM or a DVD-ROM.

What is claimed is:

1. An image processing apparatus comprising:
a generator that compares, in pixel units, sixth image data with either seventh image data or second image data, to generate a determination image,
wherein the sixth image data is obtained by selecting, in pixel units, a minimum value from among:
a value of first image data of a target for moiré determination; and
a value of fifth image data obtained by performing edge enhancement processing to the first image data,
wherein the seventh image data is obtained by performing preset first processing to second image data,
wherein the second image data is derived from a same image as the first image data,
wherein the generator generates the determination image by setting a third value for pixels where:
a value of the sixth image data is equal to or less than a value of the seventh image data or the second image data, or
the value of the sixth image data is equal to or less than a sum of the value of either the seventh image data or the second image data and a preset determination threshold value, and
wherein the generator generates the determination image by setting a value different from the third value for all other pixels.

2. The image processing apparatus according to claim 1, wherein the first processing obtains the seventh image data by selecting, in pixel units, a maximum value of a value of third image data obtained by performing smoothing processing to the second image data, a value of fourth image data obtained by performing edge enhancement processing to the second image data, and a value of eighth image data obtained by respectively selecting a maximum value of values of neighboring plural pixels for individual pixels of the second image data as values of those pixels, and
wherein the generator compares, in pixel units, the sixth image data with the seventh image data.

3. The image processing apparatus according to claim 1, wherein the generator generates the determination image by setting the third value for pixels where:
a value of third image data obtained by performing smoothing processing to the second image data is equal to or greater than a sum of the value of the second image data and a preset sixth value, and
a value of fourth image data obtained by performing edge enhancement processing to the second image data is smaller than a preset seventh value.

4. An image processing apparatus comprising:
a generator that compares, in pixel units, either sixth image data or first image data with seventh image data to generate a determination image,
wherein the sixth image data is obtained by performing preset second processing to first image data of a target for moiré determination,
wherein the seventh image data is obtained by selecting, in pixel units, a maximum value from among:
a value of third image data;
a value of fourth image data; and
a value of eighth image data,
wherein the third image data is obtained by performing smoothing processing to second image data,
wherein the second image data is derived from a same image as the first image data,
wherein the fourth image data is obtained by performing edge enhancement processing to the second image data,
wherein the eighth image data is obtained by respectively selecting a maximum value of values of neighboring plural pixels for individual pixels of the second image data as values of those pixels, and
wherein the generator generates the determination image by setting a third value for pixels where:
a value of the sixth image data or the first image data is equal to or less than a value of the seventh image data, or
the value of the sixth image data is equal to or less than a sum of the value of the seventh image data and a preset determination threshold value, and
wherein the generator generates the determination image by setting a value different from the third value for all other pixels.

5. An image processing apparatus comprising:
a generator that compares, in pixel units, tenth image data with either seventh image data or second image data, to generate a determination image,
wherein the tenth image data is obtained by selecting, in pixel units, a minimum value from among:
a value of first image data of a target for moiré determination; and
a value of ninth image data,
wherein the ninth image data is obtained by respectively selecting a minimum value from among values of neighboring plural pixels for individual pixels of fifth image data obtained by performing edge enhancement processing to the first image data as values of those pixels,
wherein the seventh image data is obtained by performing preset first processing to second image data,
wherein the second image data is derived from a same image as the first image data,
wherein the generator generates the determination image by setting a third value for pixels where:
the value of the tenth image data is equal to or less than a value of the seventh image data or the second image data, or
the value of the tenth image is equal to or less than a sum of the value of either the seventh image data or the second image data and a preset determination threshold value, and
wherein the generator generates the determination image by setting a value different from the third value for all other pixels.

6. An image processing apparatus comprising;
a generator that compares, in pixel units, either sixth image data or first image data with either seventh image data or second image data, to generate a determination image,
wherein the sixth image data is obtained by performing preset second processing to first image data of a target for moiré determination,
wherein the seventh image data is obtained by performing preset first processing to second image data,
wherein the second image data is derived from a same image as the first image data,
wherein the generator generates the determination image by setting a third value for first pixels where:
a value of the sixth image data or the first image data is equal to or less than a value of the seventh image data or the second image data, or
the value of the sixth image data is equal to or less than a sum of a value of either the seventh image data or the second image data and a preset determination threshold value,
and by setting the third value for second pixels where a value of third image data obtained by performing smoothing processing to the second image data is equal to or greater than a sum of the value of the second image data and a preset sixth value and where a value of fourth image data obtained by performing edge enhancement processing to the second image data is smaller than a preset seventh value, and
wherein the generator generates the determination image by setting a value different from the third value for all other third pixels.

7. The image processing apparatus according to claim 5, wherein the first processing obtains the seventh image data by selecting, in pixel units, a maximum value of the second image data, a value of third image data obtained by performing smoothing processing to the second image data, and a value of fourth image data obtained by performing edge enhancement processing to the second image data, and
the generator compares, in pixel units, the sixth image data or the tenth image data with the seventh image data.

8. An image processing apparatus comprising:
a generator that compares, in pixel units, a value of first image data of a target for moiré determination with a value of eleventh image data, to generate a determination image,
wherein the eleventh image data is obtained by performing, to second image data that is derived from a same image as the first image data, smoothing processing that causes a change in value in an edge portion in an image to approximate the change in the first image data, and
wherein the generator generates the determination image by setting a third value for pixels where:
the value of the first image data is equal to or less than the value of the eleventh image data, or
the value of the first image data is equal to or less than a sum of the value of the eleventh image data and a preset first value, and
wherein the generator generates the determination image by setting a value different from the third value for all other pixels.

9. The image processing apparatus according to claim 1, wherein the generator generates the determination image by setting the third value for pixels where the value of the second image data is equal to or less than a preset second value.

10. The image processing apparatus according to claim 1, wherein the value different from the third value is a value corresponding to a difference between the value of one from among the sixth image data, the tenth image data, and the first image data, and the value of one from among the seventh image data, the second image data, the third image data, and the eleventh image data.

11. An image processing apparatus comprising:
a generator that compares, in pixel units, a target for moiré determination, first image data and second image data,
wherein the second image data is derived from a same image as the first image data,
wherein the generator generates a determination image,
wherein the generator sets, in the determination image, a third value for pixels where:
the value of the first image data is equal to or less than the value of the second image data, or
the value of the first image is equal to or less than the sum of the value of the second image data and a preset determination threshold value,
wherein the generator sets, in the determination image, the third value for pixels where the value of the second image data is equal to or less than a preset second value, and
wherein the generator generates the determination image by setting a value that is different from the third value for all other pixels.

12. The image processing apparatus according to claim 11, wherein the third value is a value corresponding to the difference between the value of the first image data and the value of the second image data.

13. The image processing apparatus according to claim 11, wherein the generator compares, in pixel units, the first image data respectively with the second image data, third image data obtained by performing smoothing processing to the second image data, and fourth image data obtained by performing edge enhancement processing to the second image data, and sets, in the determination image, the third value for pixels where the value of the first image data is equal to or less than a maximum value of the value of the second image data, the value of the third image data and the value of the fourth image data, or is equal to or less than the sum of the maximum value and the first value, and for pixels where the value of the second image data is equal to or less than the second value, and sets a value that is different from the third value for all other pixels.

14. The image processing apparatus according to claim 13, wherein the value that is different from the third value is a value corresponding to the difference between the value of the first image data and the value of the third image data.

15. The image processing apparatus according to claim 1, wherein the generator generates the determination-use image per each color of image data when the first image data and the second image data comprise two or more colors.

16. The image processing apparatus according to claim 1, wherein the generator comprises a pixel number adjuster that, when at least one of the resolution and the number of pixels of the second image data is different from that of the first image data, performs at least one of resolution conversion and pixel addition to at least one of the first image data and the second image data and causes the resolution and the number of pixels of a plurality of sets of the image data to match that of the first image data.

17. The image processing apparatus according to claim 1, wherein the generator comprises a first smoothing processor that performs smoothing processing with respect to the first image data, and
wherein the generator uses the first image data to which the smoothing processing has been performed for the comparison of image data in pixel units and the generation of the determination image.

18. The image processing apparatus according to claim 17, wherein the first image data are multi-value image data that have been obtained by converting binary image data representing gradations per unit region that comprise the plural pixels with plural pixels that each take two values, the multi-value image data representing gradations per individual pixel with the individual pixels that each take multiple values, and
wherein the first smoothing processor performs the smoothing processing to the first image data using, as a unit, a local region that is equal to or greater than the size of the unit region of the first image data and is smaller than the period of moiré on the first image data.

19. The image processing apparatus according to claim 18, wherein the generator comprises a second smoothing processor that performs smoothing processing to the second image data using, as a unit, a local region that is smaller than the local region in the smoothing processing to the first image data, and
wherein the generator uses the second image data to which the smoothing processing has been performed for the comparison of image data in pixel units and the generation of the determination image.

20. The image processing apparatus according to claim 1, further comprising:
an enhancement processor that performs enhancement processing that increases the difference of the value of individual pixels in the generated determination image; and
an image output unit that outputs the determination image to which the enhancement processing has been performed.

21. The image processing apparatus according to claim 20, wherein the generator generates the determination image per each color of image data when the first image data and the second image data comprise two or more colors,
wherein the enhancement processor performs the enhancement processing to the determination images per each color that have been generated by the generator, and
wherein the image output unit generates and outputs a single image in which the determination images per each color, to which the enhancement processing has been performed, have been reduced and arrayed.

22. The image processing apparatus according to claim 1, wherein the generator generates a determination image in which the third value is set to 0, and the value that is different from the third value is set to a value corresponding to the difference between the value of either the sixth image data or the first image data, and the value of either the seventh image data or wherein the second image data, and
wherein the image processing apparatus further comprises:
a counter that counts the number of pixels in the generated determination image that are equal to or greater than a preset fourth value and
a determination output unit that determines whether or not the counting result is equal to or greater than a preset fifth value and then outputs the counting result.

23. An image processing system comprising:
the image processing apparatus according to claim 1; and
at least one of:
a plate making device that creates a printing plate that is used in a printing performed by a printing device using the first image data, and
an image formation device that performs image formation using the second image data.

24. An image processing system comprising:
the image processing apparatus according to claim 4;
and at least one of a plate making apparatus that creates a printing plate that is used in a printing performed by a printing device using the first image data, or an image formation apparatus that performs image formation using the second image data.

25. An image processing system comprising:
the image processing apparatus according to claim 5;
and at least one of a plate making apparatus that creates a printing plate that is used in a printing performed by a printing device using the first image data, or an image formation apparatus that performs image formation using the second image data.

26. An image processing system comprising:
the image processing apparatus according to claim 6;
and at least one of a plate making apparatus that creates a printing plate that is used in a printing performed by a printing device using the first image data, or an image formation apparatus that performs image formation using the second image data.

27. An image processing system comprising:
the image processing apparatus according to claim 11;
and at least one of a plate making apparatus that creates a printing plate that is used in a printing performed by a printing device using the first image data, or an image formation apparatus that performs image formation using the second image data.

28. A non-transitory storage medium storing a program which causes a computer to perform image processing, the image processing comprising:
comparing, in pixel units, sixth image data with either seventh image data or second image data; and
generating a determination image, wherein the sixth image data is obtained by selecting, in pixel units, a minimum value from among:
a value of first image data of a target for moiré determination; and
a value of fifth image data obtained by performing edge enhancement processing to the first image data,
wherein the seventh image data is obtained by performing preset first processing to second image data,
wherein the second image data is derived from a same image as the first image data,
wherein the generating the determination image comprises setting a third value for pixels where:
a value of the sixth image data is equal to or less than a value of the seventh image data or the second image data, or
the value of the sixth image data is equal to or less than a sum of the value of either the seventh image data or the second image data and a preset determination threshold value, and
wherein the generating the determination image comprises setting a value different from the third value for all other pixels.

29. A non-transitory storage medium storing a program to cause a computer to perform an image processing, the image processing comprising:
comparing, in pixel units, either sixth image data or first image data with seventh image data; and
generating a determination image,
wherein the sixth image data is obtained by performing preset second processing to first image data of a target for moiré determination,
wherein the seventh image data is obtained by selecting, in pixel units, a maximum value from among:
a value of third image data;
a value of fourth image data; and
a value of eighth image data,
wherein the third image data is obtained by performing smoothing processing to second image data,
wherein the second image data is derived from a same image as the first image data,
wherein the fourth image data is obtained by performing edge enhancement processing to the second image data,
wherein the eighth image data is obtained by respectively selecting a maximum value of values of neighboring plural pixels for individual pixels of the second image data as values of those pixels,
wherein the generating the determination image comprises setting a third value for pixels where:
a value of the sixth image data or the first image data is equal to or less than a value of the seventh image data, or
the value of the sixth image data is equal to or less than a sum of the value of the seventh image data and a preset determination threshold value, and
wherein the generating the determination image comprises setting a value different from the third value for all other pixels.

30. A non-transitory storage medium storing a program to cause a computer to perform an image processing, the image processing comprising:
comparing, in pixel units, tenth image data with either seventh image data or second image data; and
generating a determination image, wherein the tenth image data is obtained by selecting, in pixel units, a minimum value from among:
a value of first image data of a target for moiré determination; and a value of ninth image data,
wherein the ninth image data is obtained by respectively selecting a minimum value from among values of neighboring plural pixels for individual pixels of fifth image data obtained by performing edge enhancement processing to the first image data as values of those pixels,
wherein the seventh image data is obtained by performing preset first processing to second image data,
wherein the second image data is derived from a same image as the first image data;
wherein the generating the determination image comprises setting a third value for pixels where:
the value of the tenth image data is equal to or less than a value of the seventh image data or the second image data, or
the value of the tenth image data is equal to or less than a sum of the value of either the seventh image data or the second image data and a preset determination threshold value, and
wherein the generating the determination image comprises setting a value different from the third value for all other pixels.

31. A non-transitory storage medium storing a program to cause a computer to perform an image processing, the image processing comprising:
comparing, in pixel units, either sixth image data or first image data with either seventh image data or second image data; and
generating a determination image,
wherein the sixth image data is obtained by performing preset second processing to first image data of a target for moiré determination,
wherein the seventh image data is obtained by performing preset first processing to second image data,
wherein the second image data is derived from a same image as the first image data;
wherein the generating the determination image comprises setting, in the determination image, a third value for first pixels where:

a value of the sixth image data or the first image data is equal to or less than a value of the seventh image data or the second image data, or the value of the sixth image data or the first image data is equal to or less than a sum of a value of either the seventh image data or the second image data and a preset determination threshold value, wherein the generating the determination image comprises setting the third value for second pixels where a value of third image data obtained by performing smoothing processing to the second image data is equal to or greater than a sum of the value of the second image data and a preset sixth value and where a value of fourth image data obtained by performing edge enhancement processing to the second image data is smaller than a preset seventh value, and wherein the generating the determination image comprises setting a value different from the third value for all other third pixels.

32. A non-transitory storage medium storing a program to cause a computer to perform an image processing, the image processing comprising:

comparing, in pixel units, a target for moiré determination, first image data and second image data,
  wherein the second image data is derived from a same image as the first image data; and generating a determination image;

wherein the generating the determination image comprises setting a third value for pixels where:
  the value of the first image data is equal to or less than the value of the second image data, or
  the value of the first image data is equal to or less than the sum of the value of the second image data and a preset determination threshold value, wherein the generating the determination image comprises setting the third value for pixels where the value of the second image data is equal to or less than a preset second value, and wherein the generating the determination image comprises setting a value that is different from the third value for all other pixels.

33. An image processing method for operating an image processing apparatus, the method comprising:

comparing, in pixel units, sixth image data with either seventh image data or second image data; and generating a determination image, wherein the sixth image data is obtained by selecting, in pixel units, a minimum value from among:
  a value of first image data of a target for moiré determination; and
  a value of fifth image data obtained by performing edge enhancement processing to the first image data, wherein the seventh image data is obtained by performing preset first processing to second image data, wherein the second image data is derived from a same image as the first image data, wherein the generating the determination image comprises setting a third value for pixels where:
  a value of the sixth image data is equal to or less than a value of the seventh image data or the second image data, or
  the value of the sixth image data is equal to or less than a sum of the value of either the seventh image data or the second image data and a preset determination threshold value, and wherein the generating the determination image comprises setting a value different from the third value for all other pixels.

34. An image processing method for operating an image processing apparatus, the method comprising:

comparing, in pixel units, either sixth image data or first image data with seventh image data; and generating a determination image, wherein the sixth image data is obtained by performing preset second processing to first image data of a target for moiré determination, wherein the seventh image data is obtained by selecting, in pixel units, a maximum value from among:
  a value of third image data;
  a value of fourth image data; and
  a value of eighth image data, wherein the third image data is obtained by performing smoothing processing to second image data, wherein the second image data is derived from a same image as the first image data, wherein the fourth image data is obtained by performing edge enhancement processing to the second image data, wherein the eighth image data is obtained by respectively selecting a maximum value of values of neighboring plural pixels for individual pixels of the second image data as values of those pixels, wherein the generating the determination image comprises setting a third value for pixels where:
  a value of the sixth image data or the first image data is equal to or less than a value of the seventh image data, or
  the value of the sixth image data or the first image data is equal to or less than a sum of the value of the seventh image data and a preset determination threshold value, and wherein the generating the determination image comprises setting a value different from the third value for all other pixels.

35. An image processing method for operating an image processing apparatus, the method comprising:

comparing, in pixel units, tenth image data with either seventh image data or second image data; and generating a determination image, wherein the tenth image data is obtained by selecting, in pixel units, a minimum value of a value of first image data from among;
  a target for moiré determination; and
  a value of ninth image data, wherein the ninth image data is obtained by respectively selecting a minimum value from among values of neighboring plural pixels for individual pixels of fifth image data obtained by performing edge enhancement processing to the first image data as values of those pixels, wherein the seventh image data is obtained by performing preset first processing to second image data, wherein the second image data is derived from a same image as the first image data, wherein the generating the determination image comprises setting a third value for pixels where:
  the value of the tenth image data is equal to or less than a value of the seventh image data or the second image data, or
  the value of the tenth image data is equal to or less than a sum of the value of the seventh image data or the second image data and a preset determination threshold value, and wherein the generating the determination image comprises setting a value different from the third value for all other pixels.

36. An image processing method for operating an image processing apparatus, the method comprising:
comparing, in pixel units, either sixth image data or first image data with either seventh image data or second image data; and
generating a determination image,
wherein the sixth image data is obtained by performing preset second processing to first image data of a target for moiré determination,
wherein the seventh image data is obtained by performing preset first processing to second image data,
wherein the second image data is derived from a same image as the first image data,
wherein the generating the determination image comprises setting a third value for first pixels where:
a value of the sixth image data or the first image data is equal to or less than a value of the seventh image data or the second image data, or
the value of the sixth image data or the first image data is equal to or less than a sum of a value of either the seventh image data or the second image data and a preset determination threshold value,
wherein the generating the determination image comprises setting the third value for second pixels where a value of third image data obtained by performing smoothing processing to the second image data is equal to or greater than a sum of the value of the second image data and a preset sixth value and where a value of fourth image data obtained by performing edge enhancement processing to the second image data is smaller than a preset seventh value, and
wherein the generating the determination image comprises setting a value different from the third value for all other third pixels.

37. An image processing method for operating an image processing apparatus, the method comprising:
comparing, in pixel units, a target for moiré determination, first image data and second image data,
wherein the second image data is derived from a same image as the first image data; and
generating a determination image,
wherein the generating the determination image comprises setting a third value for pixels where:
the value of the first image data is equal to or less than the value of the second image data, or
the value of the first image data is equal to or less than the sum of the value of the second image data and a preset determination threshold value,
wherein the generating the determination image comprises setting the third value for pixels where the value of the second image data is equal to or less than a preset second value, and
wherein the generating the determination image comprises setting a value that is different from the third value for all other pixels.

38. The image processing apparatus according to claim 4, wherein the generator comprises a first smoothing processor that performs smoothing processing with respect to the first image data, and the generator uses the sixth image data obtained from the first image data to which the smoothing processing has been performed for the comparison of image data in pixel units and the generation of the determination image.

39. The image processing apparatus according to claim 5, wherein the generator comprises a first smoothing processor that performs smoothing processing with respect to the first image data, and the generator uses the tenth image data obtained from the first image data to which the smoothing processing has been performed for the comparison of image data in pixel units and the generation of the determination image.

40. The image processing apparatus according to claim 39, wherein the generator comprises a second smoothing processor that performs smoothing processing with respect to the second image data using, as a unit, a local region that is smaller than a local region in the smoothing processing with respect to the first image data, and the generator uses the seventh image data obtained from the second image data to which the smoothing processing has been performed for the comparison of image data in pixel units and the generation of the determination image.

41. The image processing apparatus according to claim 8, wherein the generator comprises a second smoothing processor that performs smoothing processing with respect to the second image data using, as a unit, a local region that is smaller than a local region in the smoothing processing with respect to the first image data, and the generator uses the seventh image data obtained from the second image data to which the smoothing processing has been performed for the comparison of image data in pixel units and the generation of the determination image.

42. An image processing method for operating an image processing apparatus, the method comprising:
acquiring first image data that is a target for moiré determination and second image data derived from a same image as the first image data;
obtaining fifth image data by performing edge enhancement processing on the first image data;
obtaining seventh image data by performing a first processing to the second image data;
obtaining sixth image data by selecting a minimum value from among a pixel value of the first image data and a pixel value of the fifth image data;
comparing, in pixel units, the sixth image data with either the seventh image data or the second image data;
generating a determination image by setting a third value for pixels where:
a pixel value of the sixth image data is equal to or less than a pixel value of the seventh image data or the second image data, or
the pixel value of the sixth image data is equal to or less than a sum of the pixel value of either the seventh image data or the second image data and a determination threshold value, and
wherein the generating the determination image comprises setting a value different from the third value for all other pixels.

43. An image processing apparatus comprising:
a first acquiring section that acquires first image data that is a target for moiré determination;
a second acquiring section that acquires second image data derived from a same image as the first image data;
an obtaining section that obtains fifth image data by performing edge enhancement processing on the first image data;
a generator that is adapted to:
obtain seventh image data by performing a first processing to the second image data;

obtain sixth image data by selecting a minimum value from among a pixel value of the first image data and a pixel value of the fifth image data;

compare, in pixel units, the sixth image data with either the seventh image data or the second image data; and generate a determination image by setting a third value for pixels where:
- a pixel value of the sixth image data is equal to or less than a pixel value of the seventh image data or the second image data, or
- the pixel value of the sixth image data is equal to or less than a sum of the pixel value of either the seventh image data or the second image data and a determination threshold value, and wherein the generator is adapted to generate the determination image by setting a value different from the third value for all other pixels.

* * * * *